United States Patent

Matsuno et al.

[11] Patent Number: 5,937,664
[45] Date of Patent: Aug. 17, 1999

[54] BATTERY COOLING SYSTEM FOR VEHICLE

[75] Inventors: Takayoshi Matsuno; Shunkichi Suzaki; Kiwamu Inui; Makoto Mimoto; Yoshiaki Kikuchi; Toyohiko Etoh, all of Aichi-ken, Japan

[73] Assignee: Toyota Jidosha Kabushiki Kaisha, Toyota, Japan

[21] Appl. No.: 09/034,000

[22] Filed: Mar. 3, 1998

[30] Foreign Application Priority Data

Mar. 5, 1997 [JP] Japan .................................. 9-050300
Sep. 12, 1997 [JP] Japan .................................. 9-248944

[51] Int. Cl.$^6$ ........................... F25D 23/12; F25D 17/04; B60H 1/32
[52] U.S. Cl. .............................. 62/259.2; 62/186; 62/244
[58] Field of Search ............... 62/239, 244, 259.2, 62/186, 408, 409, 428; 165/202, 41

[56] References Cited

U.S. PATENT DOCUMENTS

| | | | |
|---|---|---|---|
| 5,284,025 | 2/1994 | Kajitani et al. | 62/160 |
| 5,305,613 | 4/1994 | Hotta et al. | 62/209 |
| 5,341,652 | 8/1994 | Tajiri et al. | 62/244 |
| 5,537,831 | 7/1996 | Isaji et al. | 62/228.4 |
| 5,555,737 | 9/1996 | Takeo et al. | 62/230 |
| 5,624,003 | 4/1997 | Matsuki et al. | 180/65.1 |
| 5,669,813 | 9/1997 | Jairazbhoy et al. | 454/69 |
| 5,722,250 | 3/1998 | Pomme | 62/244 |

FOREIGN PATENT DOCUMENTS

| | | |
|---|---|---|
| 5-262144 | 10/1993 | Japan . |
| 7-73906 | 3/1995 | Japan . |
| 8-40088 | 2/1996 | Japan . |

*Primary Examiner*—William C Doerrler
*Attorney, Agent, or Firm*—Burns, Doane, Swecker & Mathis, LLP

[57] ABSTRACT

A vehicle-use battery cooling system for cooling a battery mounted in a vehicle whose vehicle compartment is air conditioned by an air conditioner, so as to maintain the battery in a predetermined temperature range, includes: a battery chamber for accommodating the battery; a cooling device having a cooling fan and adapted to cool the battery by supplying air in the vehicle compartment to an interior of the battery chamber by the cooling fan; a cooling-air circulating device for circulating air used in cooling the battery between the battery chamber and the vehicle compartment by guiding the air into the vehicle compartment; an exhausting device for exhausting the air used in cooling the battery to outside the vehicle; a changeover device for effecting a changeover between the cooling-air circulating device and the exhausting device; a temperature detecting device for detecting at least one of a temperature of the interior of the battery chamber and a temperature of the battery; and a changeover controlling device for selecting the exhausting device by the changeover device when the temperature detected by the temperature detecting device has become greater than or equal to a predetermined value.

40 Claims, 13 Drawing Sheets

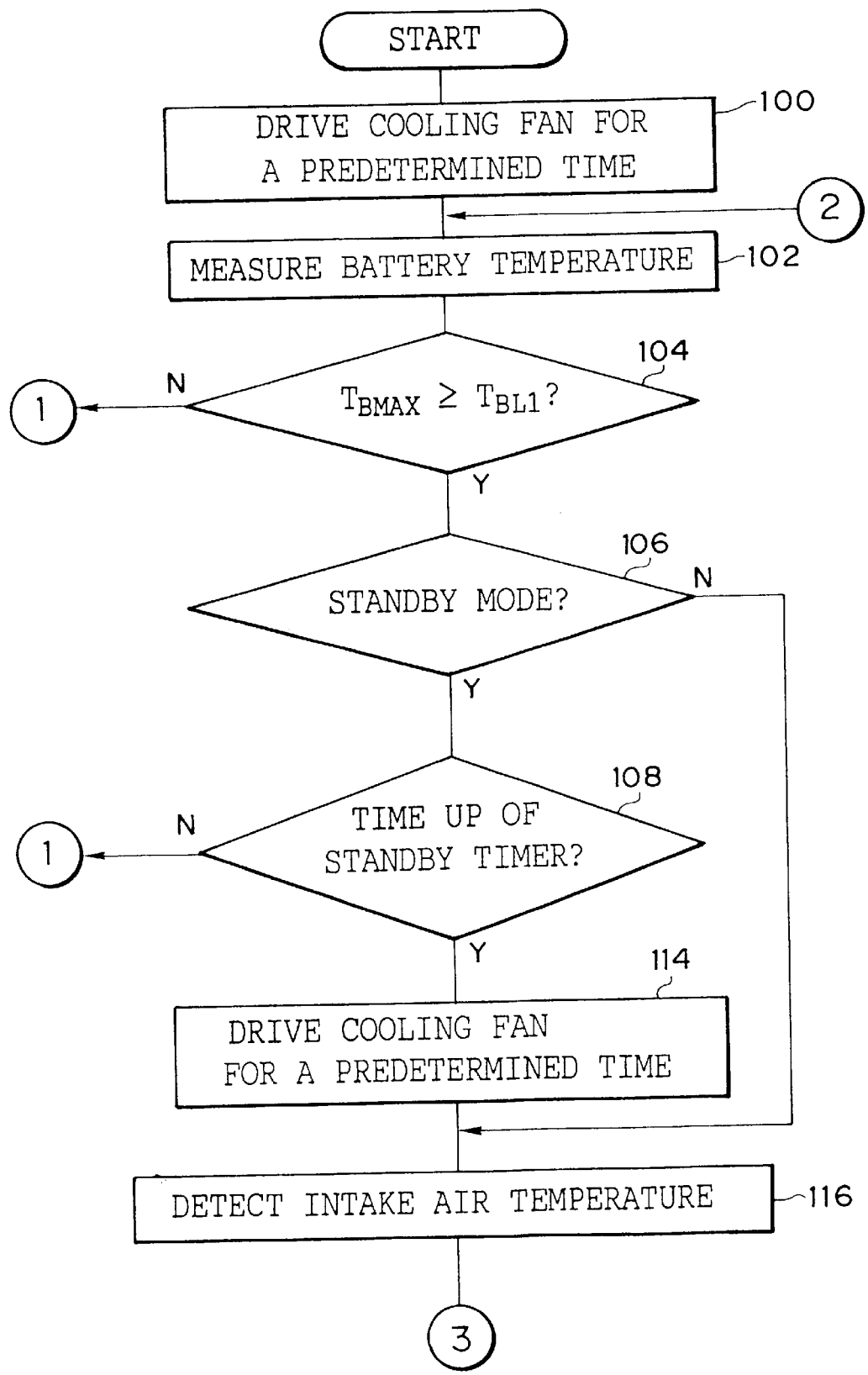

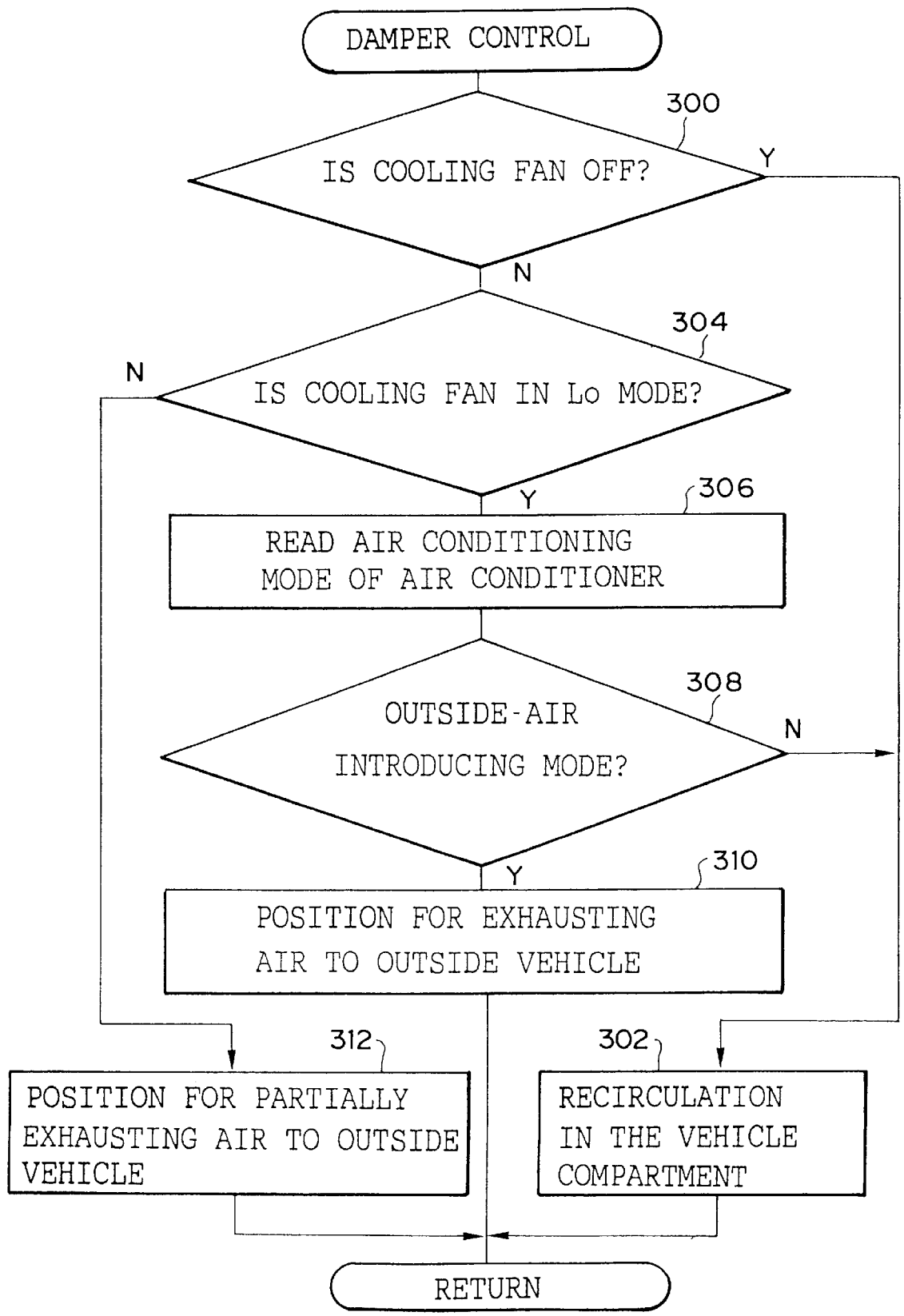

5,937,664

BATTERY COOLING SYSTEM FOR VEHICLE

BACKGROUND OF THE INVENTION

1. Field of the Invention

The present invention relates to an electric vehicle or a hybrid vehicle which is respectively equipped with an electric motor or an engine and an electric motor as a driving source or driving sources for the traveling of the vehicle. More particularly, the present invention concerns a vehicle-use battery cooling system for cooling batteries which are mounted as a driving source for an electric motor.

2. Description of the Related Art

In recent years, electric vehicles which travel by means of the driving force of an electric motor, instead of an engine which obtains its driving force by burning fuel such as gasoline, are becoming widespread. Such an electric vehicle is equipped with an electric motor and rechargeable batteries as a driving source for driving the electric motor, and travels as the electric motor is driven by electric power supplied from the batteries. The electric vehicle is capable of traveling continually as the batteries are recharged at predetermined timings.

In the batteries mounted in the electric vehicle, heat generation occurs not only during charging but also during discharging for supplying power to the electric motor. In addition, if the temperature rises, not only does the performance of the batteries decline, but also the life of the batteries declines appreciably. On the other hand, if the temperature drops, outputs of the batteries naturally decline, and the charging efficiency also declines.

For this reason, some electric vehicles are provided with cooling and heating apparatuses for cooling or heating batteries. In the electric vehicle equipped with this heating and cooling apparatus for the batteries, the batteries are accommodated in a predetermined accommodating space, and the accommodating space is maintained within a predetermined temperature range by the cooling and heating apparatus.

For example, as vehicle-use battery cooling systems adapted to maintain the batteries within a predetermined temperature range, the following systems are known: one in which the battery temperature is detected and the cooling air from the air conditioner is supplied to the battery accommodating space as disclosed in Japanese Patent Application Laid-Open (JP-A) No. 7-73906, one in which the air conditioned during the temperature rise of the batteries is introduced to cool the batteries as disclosed in Japanese Patent Application Laid-Open (JP-A) No. 5-262144, and one in which the air volume of the blower is increased when the battery temperature has exceeded a predetermined level as disclosed in Japanese Patent Application Laid-Open (JP-A) No. 8-40088.

In the cooling and heating apparatuses for batteries disclosed in these publications, the temperature of the batteries or the temperature of the battery accommodating space is detected, and on the basis of the detected result cold air or warm air is forcibly supplied from the air conditioner for effecting the air conditioning of the vehicle compartment.

However, since these cooling and heating apparatuses effect the cooling and the like of the batteries by forcibly producing cold air or warm air irrespective of the state of air conditioning of the vehicle compartment, the comfortable feature of the vehicle compartment is impaired.

Meanwhile, the vehicle compartment interior is maintained within a temperature range of 20° C.–30° C. by the air conditioner, and the temperature for using the batteries in an optimum condition is higher than this vehicle compartment temperature. As the air in the vehicle compartment is supplied to the battery accommodating chamber as necessary, it is possible to effect the cooling of the batteries efficiently without stopping the air conditioning of the vehicle compartment. Consequently, it becomes possible to efficiently cool the batteries while maintaining the air-conditioned state of the vehicle compartment by means of the air conditioner.

However, there are cases where the temperature of the batteries becomes high depending on the condition of use, and if the air used for cooling the batteries enters the vehicle compartment, the temperature of the vehicle compartment interior is increased, and the cooling load of the air conditioner becomes higher, or the temperature of the vehicle compartment interior is locally increased, thereby causing an increase in the heat loss, impairment of the comfortable feature of the vehicle compartment, and the like.

SUMMARY OF THE INVENTION

The present invention has been devised in view of the above-described circumstances, and it is an object of the present invention to provide a vehicle-use battery cooling system which is capable of cooling batteries efficiently without impairing the comfortable feature of the vehicle compartment being air conditioned.

In accordance with a first aspect of the present invention, there is provided a vehicle-use battery cooling system for cooling a battery mounted in a vehicle whose vehicle compartment is air conditioned by an air conditioner, so as to maintain the battery in a predetermined temperature range, comprising: a battery chamber for accommodating the battery; cooling means having a cooling fan and adapted to cool the battery by supplying air in the vehicle compartment to an interior of the battery chamber by the cooling fan; cooling-air circulating means for circulating air used in cooling the battery between the battery chamber and the vehicle compartment by guiding the air into the vehicle compartment; exhausting means for exhausting the air used in cooling the battery to outside the vehicle; changeover means for effecting a changeover between the cooling-air circulating means and the exhausting means; temperature detecting means for detecting at least one of a temperature of the interior of the battery chamber and a temperature of the battery; and changeover controlling means for selecting the exhausting means by the changeover means when the temperature detected by the temperature detecting means has become greater than or equal to a predetermined value.

In accordance with this aspect of the present invention, the temperature of the interior of the battery chamber or the temperature of the battery is detected, and the changeover means is controlled on the basis of the result of this determination. At this time, when the battery temperature is high, the exhausting means is selected without selecting the cooling-air circulating means. As a result, it is possible to prevent the impairment of the comfortable feature of the vehicle compartment as the high-temperature cooling air is returned to the interior of the vehicle compartment after cooling the battery, and to prevent the air conditioning load from becoming large. Incidentally, the temperature detecting means may detect the temperature of the battery, or may detect the ambient temperature of the battery, i.e., the temperature of the interior of the battery chamber, or both of the temperature of the battery and the temperature of the interior of the battery chamber.

In accordance with a second aspect of the present invention, the vehicle-use battery cooling system according to the first aspect of the invention further comprises: circulating-volume increasing means for increasing a volume of air to be circulated into the vehicle compartment by the cooling-air circulating means when a volume of air being delivered by the cooling fan of the cooling means is at a predetermined level or more.

In accordance with this aspect of the present invention, when the volume of cooling air taken in from the interior of the vehicle compartment is large, the volume of air circulated by the cooling-air circulating means is increased, and it is possible to prevent a decline in the pressure within the vehicle compartment and prevent an increase in the volume of air entering the interior of the vehicle compartment through gaps and the like of the vehicle body without being air conditioned. Namely, if a large volume of air is taken in from the interior of the vehicle compartment being air conditioned, the pressure within the vehicle compartment drops, and the volume of air which enters the interior of the vehicle compartment through the gaps and the like in the vehicle body without being air conditioned increases, thereby impairing the comfortable feature of the vehicle compartment and increasing the air conditioning load. However, it is possible to prevent such a situation.

In accordance with a third aspect of the present invention, the vehicle-use battery cooling system according to the first aspect of the invention further comprises: comparing means for comparing a volume of air delivered from outside the vehicle into the vehicle compartment by a blower fan provided in the air conditioner and a volume of air delivered by the cooling fan; and circulating-volume increasing means for increasing a volume of air to be circulated into the vehicle compartment by the cooling-air circulating means when the volume of air being delivered by the cooling fan is greater as a result of comparison by the comparing means.

In accordance with this aspect of the present invention, a comparison is made between the volume of air delivered into the vehicle compartment by the blower fan and the volume of air taken in from the interior of the vehicle compartment by the cooling fan, and when the volume of cooling air is large, the volume of air circulated by the circulating means is increased.

As the volume of circulating air which is returned to the interior of the vehicle compartment is increased, it is possible to prevent a decline in the pressure within the vehicle compartment, so that the volume of air which enters the interior of the vehicle compartment through the gaps and the like in the vehicle body does not increase, and the comfortable feature of the vehicle compartment is not impaired. In addition, since the pressure within the vehicle compartment is not caused to drop, the volume of cooling air does not decline, and it is possible to cool the battery appropriately by a desired volume of cooling air.

In accordance with a fourth aspect of the present invention, in the vehicle-use battery cooling system according to the first and third aspects of the invention, the circulating-volume increasing means selects the cooling-air circulating means by means of the changeover means.

In accordance with this aspect of the present invention, as the cooling-air circulating means is selected by the changeover means, the volume of air to be circulated is increased. In addition, if selection is made by the changeover means such that the volume of cooling air exhausted to outside vehicle by the exhausting means becomes large, the volume of air circulated by the cooling-air circulating means can be decreased to the contrary.

In accordance with a fifth aspect of the present invention, there is provided a vehicle-use battery cooling system for cooling a battery mounted in a vehicle whose vehicle compartment is air conditioned by an air conditioner, so as to maintain the battery in a predetermined temperature range, comprising: a battery chamber for accommodating the battery; cooling means having a cooling fan and adapted to cool the battery by supplying air in the vehicle compartment to an interior of the battery chamber by the cooling fan; cooling-air circulating means for circulating air used in cooling the battery between the battery chamber and the vehicle compartment by guiding the air into the vehicle compartment; exhausting means for exhausting the air used in cooling the battery to outside the vehicle; changeover means for effecting a changeover between the cooling-air circulating means and the exhausting means; battery-residual-capacity detecting means for detecting a residual capacity of the battery; battery-residual-capacity determining means for determining whether or not the detected residual capacity is within a predetermined range set in advance; and exhaust controlling means for selecting the exhausting means by means of the changeover means and operating the cooling means when it is determined by the battery-residual-capacity determining means that the detected residual capacity is outside the predetermined range.

In accordance with this aspect of the present invention, cooling air is forcibly exhausted to outside the vehicle in correspondence with the result of detection by the battery-residual-capacity determining means. The amount of heat generated by a battery changes substantially in accordance with its residual capacity. For this reason, the amount of heat generation and the load on the battery can be estimated from the residual capacity of the battery. Since the cooling air is forcibly exhausted to outside the vehicle on the basis of this estimation, the cooling air used in cooling the battery which has generated heat and assumed a high temperature is prevented from being returned to the interior of the vehicle compartment. Thus, it is possible to prevent in advance the impairment of the comfortable feature of the vehicle compartment and an increase in the load on the air conditioner.

In accordance with a sixth aspect of the present invention, in the vehicle-use battery cooling system according to the fifth aspect of the invention, the exhaust controlling means requests the air conditioner to introduce outside air into the vehicle compartment irrespective of a state of operation of the air conditioner.

In accordance with this aspect of the present invention, a request is made so that the volume of outside air introduced by the air conditioner increases when the cooling air used in cooling the battery is forcibly exhausted.

As a result, it is possible to allow a large volume of outside air to be introduced into the vehicle compartment. As the outside air is introduced, it is possible to prevent a decline in the volume of cooling air, and to reliably exhaust the cooling air to outside the vehicle.

In accordance with a seventh aspect of the present invention, there is provided a vehicle-use battery cooling system for cooling a battery mounted in a vehicle whose vehicle compartment is air conditioned by an air conditioner, so as to maintain the battery in a predetermined temperature range, comprising: a battery chamber for accommodating the battery; cooling means having a cooling fan and adapted to cool the battery by supplying air in the vehicle compartment to an interior of the battery chamber by the cooling fan; cooling-air circulating means for circulating air used in cooling the battery between the battery chamber and the vehicle compartment by guiding the air into the vehicle compartment; exhausting means for exhausting the air used in cooling the battery to outside the vehicle; changeover means for effecting a changeover between the cooling-air circulating means and the exhausting means; air-conditioning load determining means for determining an air conditioning load required for the air conditioner in air conditioning an interior of the vehicle compartment; and cooling controlling means for stopping the operation of the cooling fan when it is determined by the air-conditioning load determining means that the air conditioning load is greater than a predetermined value.

In accordance with an eighth aspect of the present invention, the vehicle-use battery cooling system according to the seventh aspect further comprises: vehicle-compartment-temperature detecting means for detecting a temperature of the interior of the vehicle compartment, and the air-conditioning load determining means determines the air conditioning load by making a comparison between the temperature of the interior of the vehicle compartment detected by the vehicle-compartment-temperature detecting means and a set temperature set in the air conditioner.

In accordance with this aspect of the present invention, the cooling fan is stopped when the air conditioning load in air conditioning the vehicle compartment is large. Hence, it is possible to prevent a further increase in the cooling load in cooling the interior of the vehicle compartment as a result of unnecessarily exhausting the air-conditioned air or recirculating the cooling air, thereby permitting efficient air conditioning of the vehicle compartment.

In accordance with this aspect of the present invention, the air conditioning load is determined by the set temperature and the temperature of the interior of the vehicle compartment being air conditioned. Since the air conditioner effects air conditioning so as to set the temperature of the interior of the vehicle compartment to the set temperature, when the difference between the set temperature and the temperature of the interior of the vehicle compartment is large, it can be determined that the air conditioning load is large. Thus, the air conditioning load can be determined simply from the set temperature and the temperature of the interior of the vehicle compartment.

In accordance with a ninth aspect of the present invention, in the vehicle-use battery cooling system according to the eighth aspect of the invention, the air-conditioning load determining means determines that the air conditioning load is large when a difference between the temperature of the interior of the vehicle compartment detected by the vehicle-compartment-temperature detecting means and the set temperature is large, and when the temperature of delivered air which is delivered from the air conditioner into the vehicle compartment is lower than a predetermined value.

In accordance with this aspect of the present invention, whether or not the cooling load is large is determined from the temperature of the delivered air which is delivered into the vehicle compartment when the interior of the vehicle compartment is air conditioned by the air conditioner, in addition to the difference between the set temperature and the temperature of the interior of the vehicle compartment.

In general, the targeted diffused air temperature of the air conditioner is set such that the temperature of the interior of the vehicle compartment becomes the set temperature, and the air conditioner is controlled such that the air at the targeted diffused air temperature is delivered into the vehicle compartment. In addition, when the cooling load is large and the interior of the vehicle compartment is to be cooled rapidly, the targeted diffused air temperature of the air conditioner is set to be low. Hence, the cooling load can be determined from whether or not the targeted diffused air temperature has exceeded the temperature set in advance.

As a result, when the interior of the vehicle compartment is heated, even if the temperature of the vehicle compartment has become higher than the set temperature, it is possible to prevent a determination from being made that the cooling load is large.

In accordance with a 10th aspect of the present invention, there is provided a vehicle-use battery cooling system for cooling a battery mounted in a vehicle whose vehicle compartment is air conditioned by an air conditioner, so as to maintain the battery in a predetermined temperature range, comprising: a battery chamber for accommodating the battery; cooling means having a cooling fan and adapted to cool the battery by supplying air in the vehicle compartment to an interior of the battery chamber by the cooling fan; cooling-air circulating means for circulating air used in cooling the battery between the battery chamber and the vehicle compartment by guiding the air into the vehicle compartment; exhausting means for exhausting the air used in cooling the battery to outside the vehicle; changeover means for effecting a changeover between the cooling-air circulating means and the exhausting means; temperature detecting means for detecting at least one of a temperature of the interior of the battery chamber and a temperature of the battery; increase-rate determining means for determining an increase rate of the temperature of the battery on the basis of a result of detection by the temperature detecting means; and changeover controlling means for selecting the exhausting means by the changeover means on the basis of a result of determination by the increase-rate determining means.

In accordance with this aspect of the present invention, when it is determined by the increase-rate determining means that the increase rate of the battery temperature is large, the air used in cooling the battery is exhausted to outside the vehicle. As a result, it is possible to prevent a decline in the cooling efficiency due to the fact that the air whose temperature has become high after cooling the battery is returned to the interior of the vehicle compartment. In addition, it is possible to prevent the occurrence of discomfort due to the fact that the air which has become warm after cooling the battery is returned to the interior of the vehicle compartment.

In accordance with an 11th aspect of the present invention, in the vehicle-use battery cooling system according to the 10th aspect of the invention, the increase-rate determining means changes a criterion for determining the increase rate in correspondence with the temperature detected by the temperature detecting means.

In accordance with this aspect of the present invention, the criterion for determining the increase rate is changed in correspondence with the temperature of the battery.

The battery needs to be cooled when its temperature rises. In addition, when the battery temperature is high, the cooling of the battery is required in comparison with the time when the battery temperature is low even if the rate of increase in the battery temperature is small.

Accordingly, by changing the criterion for determining the rate of increase in the battery temperature in correspondence with the battery temperature, it is possible to cool the battery appropriately in correspondence with the temperature. Further, it is possible to prevent a situation in which the efficiency of air conditioning of the vehicle compartment is caused to decline by cooling the battery unnecessarily when the battery temperature is relatively low, thereby impairing the comfortable feature of the vehicle compartment.

As described above, in accordance with the present invention, since the exhausting means and the cooling-air circulating means are changed over on the basis of the battery temperature and the residual capacity of the battery, the battery can be cooled by using the air inside the air-cooled vehicle compartment without impairing the comfortable feature of the vehicle compartment.

In addition, in the present invention, since the cooling-air circulating means and the exhausting means are changed over in correspondence with the volume of cooling air delivered by the cooling fan and the volumes of air delivered by the blower fan and the cooling fan, the pressure within the vehicle compartment is not caused to decline, so that the battery can be reliably cooled while ensuring the comfortable feature of the vehicle compartment.

Furthermore, in the present invention, since the cooling fan and the changeover means are controlled in correspondence with the state of operation of the air conditioner and the air-conditioned state of the vehicle compartment, it is possible to obtain an outstanding advantage in that it is possible to prevent an increase in the air conditioning load, including an increase in the heat loss.

The above and other objects, features and advantages of the present invention will become more apparent from the following detailed description of the invention when read in conjunction with the accompanying drawings.

BRIEF DESCRIPTION OF THE DRAWINGS

FIG. 4A is a flowchart illustrating an example of the operation of the cooling apparatus in accordance with the first embodiment;

FIG. 11 is a flowchart illustrating an example of control of a changeover damper in accordance with the third embodiment.

DESCRIPTION OF THE PREFERRED EMBODIMENTS

Figure 1:
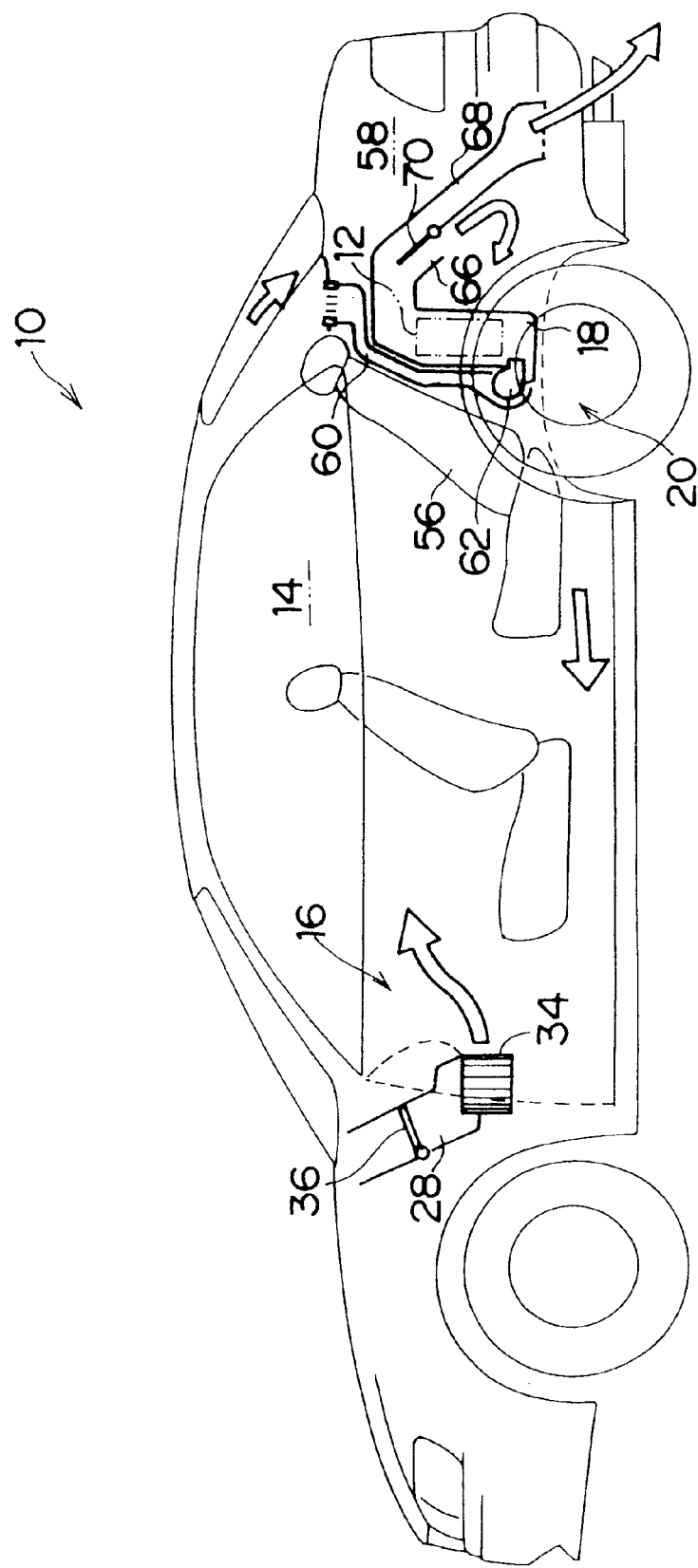
FIG. 1 is a schematic diagram of a vehicle illustrating the arrangement of an air conditioner and a cooling apparatus of the present invention.

FIG. 1 shows a vehicle 10 to which the embodiments of the present invention are suitably applied. This vehicle 10 is adapted to travel by the driving of an unillustrated electric motor. For this reason, the vehicle 10 is provided with batteries 12 for driving the electric motor. It should be noted that, as the vehicle 10 to which the present invention is applied, it is possible to use an electric vehicle which travels by means of an electric motor or a so-called hybrid vehicle which is equipped with an electric motor in addition to an engine as driving power sources for traveling. Namely, it suffices if the vehicle is equipped with batteries for driving the electric motor. In addition, as the vehicle 10, an electric vehicle and a hybrid vehicle having general configurations can be used, and a detailed description of this vehicle 10 will be omitted in this embodiment.

This vehicle 10 is provided with an air conditioner 16 for air conditioning a vehicle compartment 14. Further, a battery chamber 18 and a cooling apparatus 20 for cooling the batteries in the battery chamber 18 are provided.

Figure 2:
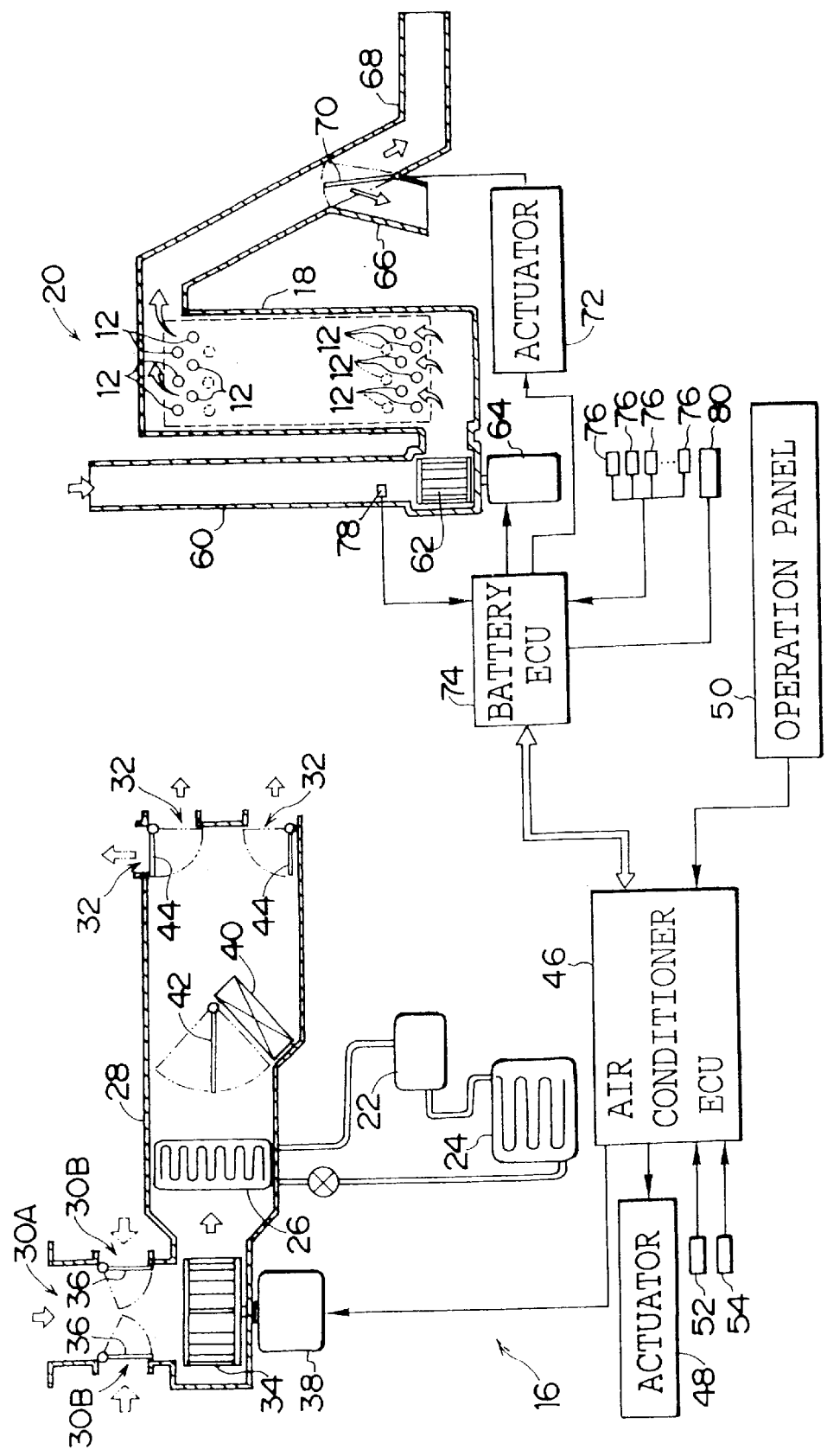
FIG. 2 is a schematic diagram illustrating configurations of the air conditioner and the cooling apparatus of the present invention.

As shown in FIG. 2, in the air conditioner 16, a refrigeration cycle is formed by a refrigerant circulation circuit including a compressor 22, a condenser 24, and an evaporator 26. The evaporator 26 is disposed in an air conditioning duct 28, and air intake ports 30A and 30B are formed at one open end of the air conditioning duct 28. The air conditioning duct 28 communicates with the outside of the vehicle 10 by means of the air intake port 30A, and communicates with the vehicle compartment 14 by means of the air intake ports 30B. Air outlets 32 are formed at the other open end of the air conditioning duct 28. The air outlets 32 are largely classified into a defroster air outlet, a register air outlet, and a foot air outlet.

Inside the air conditioning duct 28, a blower fan 34 is provided as a blower means located between the evaporator 26 and the air intake ports 30A and 30B. Changeover dampers 36 are provided in the vicinities of the air intake ports 30A and 30B so as to open and close the air intake ports 30A and 30B.

The blower fan 34 is rotated as a blower motor 38 is driven. At this time, in the state in which the air intake port 30A is closed by the changeover dampers 36, the mode is set in an inside-air recirculation mode in which air inside the vehicle compartment is introduced into the air conditioning duct 28. Meanwhile, in the state in which the air intake ports 30B are closed by the changeover dampers 36, the mode is set in an outside-air introducing mode in which outside air is introduced into the air conditioning duct 28. The air taken in by the blower fan 34 is blown out from the air outlets 32 into the vehicle compartment 14.

In the air conditioning duct 28, a heater core 40, an air-mixing damper 42, and mode changeover dampers 44 are provided on the downstream side of the evaporator 26, and part of the air cooled by the evaporator 26 is delivered to the heater core 40 by the air-mixing damper 42 and is thereby heated. The air which passed through the heater core 40 and the air which bypassed the heater core 40 are mixed upstream of the mode changeover dampers 44, and the mixed air is blown out as air-conditioning air from the air outlets 32 selected by the mode changeover dampers 44 into the vehicle compartment 14.

The air conditioner 16 is provided with a controller 46 (hereafter referred to as the air conditioner ECU 46) having a microcomputer. An actuator 48 for driving the blower motor 38 and the changeover dampers 36 are connected to the air conditioner ECU 46.

Further, an operation panel 50 is connected to the air conditioner ECU 46, and the operating conditions of the air conditioner 16 are set as a vehicle occupant operates the operation panel 50. Namely, the operation of switches on the operation panel 50 permits the setting of such as a set temperature of the interior of the vehicle compartment 14, the outside-air introducing mode or the inside-air recirculation mode, and the air volume of the blower.

In addition, in conjunction with an evaporator-passed air temperature sensor for detecting the temperature of air after passing the evaporator 26 as well as a solar radiation sensor (neither are shown), an outside-air temperature sensor 52 for detecting the temperature of the air outside the vehicle, a vehicle compartment temperature sensor 54 for detecting the temperature of the vehicle compartment interior, and the like, all of which serve as an environmental condition detecting means, are connected to the air conditioner ECU 46. On the basis of the operating conditions including the environmental conditions detected by signals from these sensors, as well as the set temperature, the air volume of the blower, and the outside-air introducing mode or the inside-air recirculation mode which have been set by the operation panel 50, the air conditioner ECU 46 determines the cooling load (i.e., the air conditioning load), and effects the air conditioning of the vehicle compartment so as to set the temperature of the vehicle compartment interior to a set level.

Meanwhile, as shown in FIG. 1, the battery chamber 18 is provided in a space between a rear seat back 56 and a trunk room 58 of the vehicle 10.

As shown in FIGS. 1 and 2, one end of a cooling duct 60 having another end open toward the interior of the vehicle compartment 14 is connected to and is open in the battery chamber 18. A cooling fan 62 is provided in this cooling duct 60, and the air from the vehicle compartment 14, which is conditioned by the driving of a fan motor 64, is supplied to the interior of the battery chamber 18 as cooling air.

In the battery chamber 18, respective one ends of a circulation duct 66 constituting a circulating means and an exhaust duct 68 constituting an exhaust means are open on a side which is opposite to the cooling duct 60 with the batteries 12 located therebetween. The circulation duct 66 has another end open in, for example, the trunk room 58, and communicates with the interior of the vehicle compartment 14 via this trunk room 58. Meanwhile, another end of the exhaust duct 68 is open to outside the vehicle.

A changeover damper 70 serving as a changeover means is provided between the circulation duct 66 and the exhaust duct 68. This changeover damper 70 is actuated by an actuator 72 such as a servo motor, and is adapted to open or close the circulation duct 66 and the exhaust duct 68.

The batteries 12 provided in the battery chamber 18 are adapted to be cooled by the air inside the vehicle compartment 14 which is supplied by the cooling fan 62. The air, after cooling the batteries 12, is adapted to be returned to the interior of the vehicle compartment 14 via the circulation duct 66 with the exhaust duct 68 closed by the changeover damper 70, and is adapted to be exhausted to outside the vehicle via the exhaust duct 68 as the changeover damper 70 closes the circulation duct 66.

Namely, the cooling apparatus 20 is capable of selecting between a recirculation mode in which cooling air is recirculated by means of the changeover damper 70 via the circulation duct 66 and an exhaust mode in which the cooling air is exhausted to outside the vehicle via the exhaust duct 68. In addition, with the cooling apparatus 20, by adjusting the amounts of opening at the circulation duct 66 and the exhaust duct 68 by means of the changeover damper 70, it is possible to select a recirculation/exhaust mode for effecting the recirculation and discharging of the cooling air at a predetermined ratio or an arbitrary ratio.

The cooling apparatus 20 is provided with a battery ECU 74. The fan motor 64 and the actuator 72 are connected to the battery ECU 74, and the cooling fan 62 and the changeover damper 70 are controlled by the battery ECU 74.

Further, battery temperature sensors 76, a cooling-air temperature sensor 78, and a state-of-charge (SOC) sensor 80 are also connected to the cooling apparatus 20. By means of these sensors, the battery ECU 74 is capable of detecting the temperatures of the batteries 12, the temperature of the cooling air (specifically, the air inside the vehicle compartment) passing through the cooling duct 60, and the residual capacities of the batteries 12. On the basis of the results of detection thereof, the batteries 12 are cooled to maintain their temperatures within an appropriate temperature range. It should be noted that the battery temperature sensors 76 are provided for the respective batteries 12, and the battery ECU 74 is adapted to detect the temperature of each battery 12.

Figure 3:
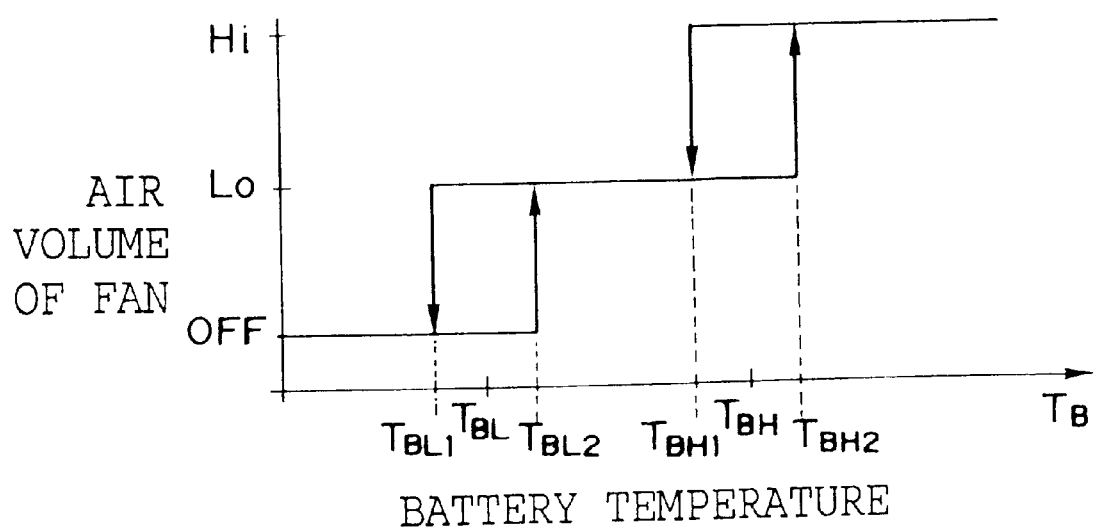
FIG. 3 is a diagram illustrating an example of the air volume delivered by a cooling fan of the cooling apparatus relative to the battery temperature in accordance with a first embodiment.

For example, as shown in FIG. 3, in a first embodiment the battery ECU 74 is adapted to change over the volume of air cooled by the cooling fan 62 to a high (Hi) level, a low (Lo) level, and OFF (stop) on the basis of a battery temperature $T_B$ detected by the battery temperature sensors 76. At this time, the cooling fan 62 is changed over from the Lo level to OFF when the battery temperature $T_B$ has become less than or equal to a temperature $T_{BL1}$ with a temperature $T_{BL}$ being intermediate between the temperature $T_{BL1}$ and a temperature $T_{BL2}$, and the cooling fan 62 is changed over from OFF to the Lo level when the battery temperature $T_B$ has become greater than or equal to the temperature $T_{BL2}$. Further, the cooling fan 62 is changed over from the Hi level to the Lo level when the battery temperature $T_B$ has reached a temperature $T_{BH1}$ with a temperature $T_{BH}$ being intermediate between the temperature $T_{BH1}$ and a temperature $T_{BH2}$, and the cooling fan 62 is changed over from the Lo level to the Hi level when the battery temperature $T_B$ has exceeded the temperature $T_{BH2}$.

The aforementioned air conditioning ECU 46 of the air conditioner 16 is also connected to the battery ECU 74. From the air conditioner ECU 46, the battery ECU 74 is capable of reading the operating conditions of the air conditioner 16, such as the outside-air introducing mode or the inside-air recirculation mode, the set temperature, and the air volume of the blower. Further, the battery ECU 74 is adapted to designate to the air conditioner ECU 46 a change in the operating conditions such as the setting of the mode to the outside-air introducing mode. If a change in the operating conditions is designated from the battery ECU 74, the air conditioner ECU 46 is adapted to effect the air conditioning operation under the designated operating condition.

Referring now to the flowcharts shown in FIGS. 4A, 4B, and 5, a description will be given of an outline of the operation of the cooling apparatus 20 and the resulting operation of the air conditioner 16 as the operation of this embodiment. It should be noted that the air conditioner 16 is operated by a conventionally known controlling method in accordance with the environmental conditions and the set conditions so as to effect the air conditioning of the interior of the vehicle compartment 14, and a detailed description thereof will be omitted.

Figure 4B:
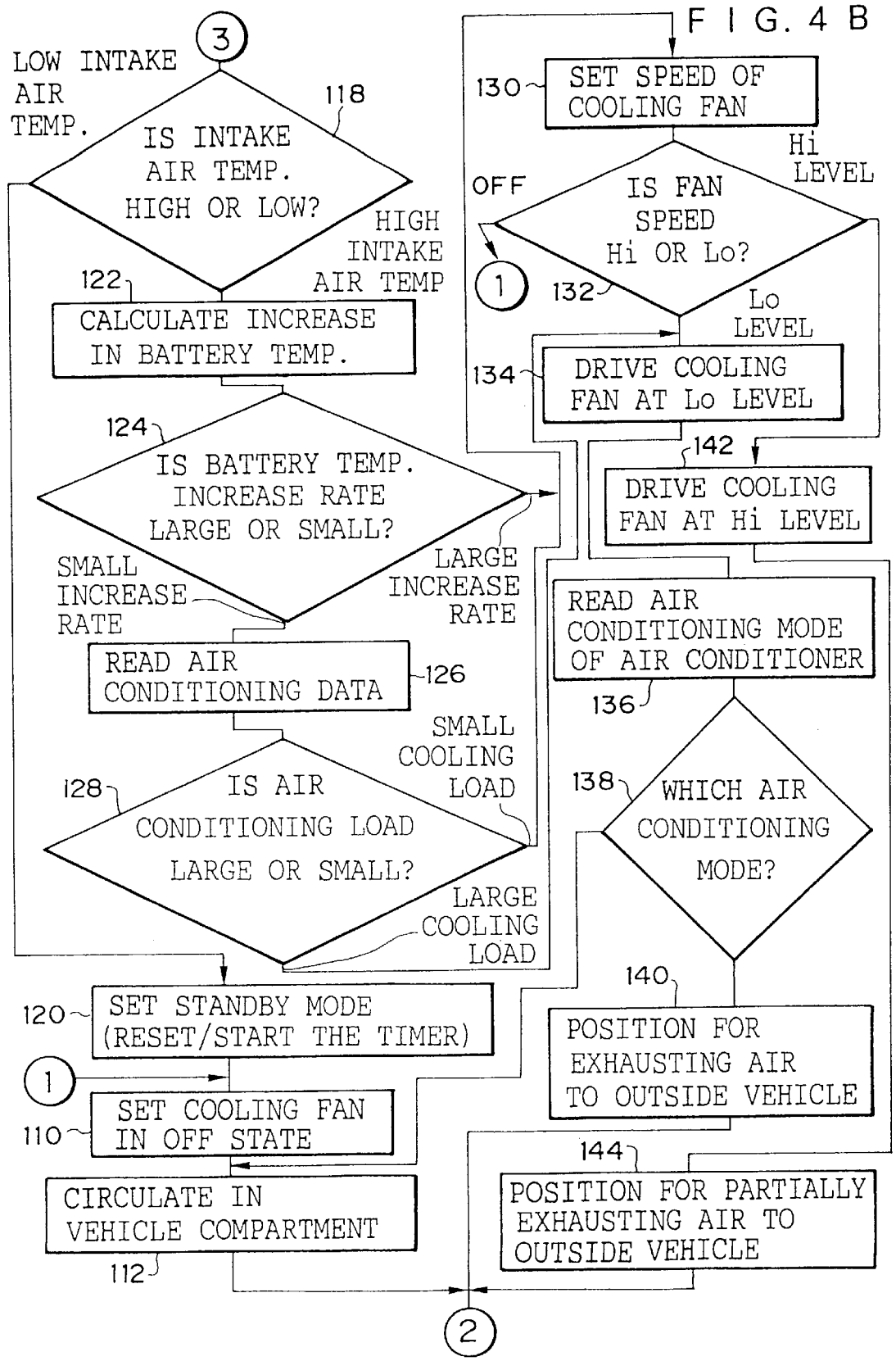
FIG. 4B is a flowchart continuing from FIG. 4A.

FIGS. 4A and 4B show an outline of the operation of the cooling apparatus 20 to which the present invention is applied. These flowcharts are executed if an unillustrated ignition switch for the traveling and the like of the vehicle 10 is turned on, and are repeatedly executed until the ignition switch is turned off (the flowcharts are executed in intervals of several seconds to tens of seconds, for example).

When these flowcharts are executed, in Step 100, the cooling fan 62 is first driven for a predetermined time (e.g., 10 seconds) to supply air in the cooling duct 60 and air in the vehicle compartment 14 into the battery chamber 18. Subsequently, in Step 102, the battery temperature $T_B$ is measured by each battery temperature sensor 76. In an ensuing Step 104, a determination is made as to whether or not a battery temperature $T_{BMAX}$ of the battery 12 exhibiting the highest temperature is greater than or equal to the predetermined temperature $T_{BL1}$ (e.g., 35° C.) at which level or higher cooling is generally required.

If YES is the answer in Step 104, the operation proceeds to Step 106 to confirm whether or not the mode is a standby mode. In the standby mode, the cooling fan 62 is kept in the stopped state until the battery temperature $T_{BMAX}$ reaches the temperature $T_{BL2}$ even if the battery temperature $T_{BMAX}$ is greater than or equal to the minimum temperature $T_{BL1}$ for driving the cooling fan 62. In the meantime, the battery temperatures and the intake air temperature are measured at predetermined time intervals (e.g., every 5 minutes). During the standby mode, the time interval of temperature measurement is measured by a standby timer. Incidentally, the duration of the standby time may be determined arbitrarily in a range of several minutes to tens of minutes.

Here, if the mode is determined to be the standby mode (YES in the determination in Step 106), and the time of the standby timer is not up (NO in the determination in Step 108), the operation proceeds to Step 110 to set the cooling fan 62 in the OFF state, and in Step 112 the mode is set in the recirculation mode in which the exhaust duct 68 is closed by the changeover damper 70.

As a result, the cooling air is not supplied to the interior of the battery chamber 18, and if the batteries 12 have undergone heat generation, the temperature of the interior of the battery chamber 18 increases gradually, thereby making it possible to prevent the batteries 12 from becoming cooled more than necessary. It should be noted that also when the battery temperature $T_B$ has not reached the predetermined temperature (NO in the determination in Step 104), the cooling fan 62 is stopped, and the exhaust duct 68 is closed by the changeover damper 70, thereby preventing the air inside the vehicle compartment 14 from being discharged to outside the vehicle via the battery chamber 18.

On the other hand, if the time of the standby timer is up here (YES in the determination in Sep 108), the operation proceeds to Step 114 in which the cooling fan 62 is driven for a predetermined time (e.g., several seconds; in this embodiment, the time is set to 10 seconds as an example) to take the air inside the vehicle compartment 14 being air conditioned by the air conditioner 16 into the cooling duct 60. Then, the intake air temperature $T_C$ of the air thus taken in and serving as cooling air is measured by the cooling-air temperature sensor 78 (Step 116).

It should be noted that if the mode is not the standby mode (NO in the determination in Step 106), the state is generally one in which the cooling fan 62 is already being driven. In addition, when this flow chart is started, the cooling fan 62 is driven in the first Step 100, the operation directly proceeds to Step 116 to measure the intake air temperature $T_C$.

In an ensuing Step 118, a determination is made as to whether or not the intake air temperature $T_C$ is lower than a battery temperature $T_{BMIN}$ of the battery 12 exhibiting the lowest temperature. That is, the interior of the vehicle compartment 14 is maintained within a predetermined temperature range by the air conditioner 16, and this temperature range is lower than a proper temperature range of the batteries 12. Accordingly, when the intake air temperature $T_C$ is lower than the lowest battery temperature $T_{BMIN}$, there is a possibility of lowering the temperatures of the batteries 12 more than necessary if the cooling fan 62 is operated, so that an attempt is made to prevent a decline in the temperatures of the batteries 12. Thus, when the intake air temperature $T_C$ is lower than the battery temperature $T_{BMIN}$ (a determination of "low intake air temperature" is made in Step 118), the operation proceeds to Step 120 to reset and start the standby timer, thereby assuming the standby mode.

On the other hand, when the intake air temperature $T_C$ is higher than the battery temperature $T_{BMIN}$ (a determination of "high intake air temperature" is made in Step 118), the operation proceeds to Step 122 to calculate the increase in the battery temperature. As for the increase in the battery temperature, a history of the change in the battery temperature $T_B$ is stored in advance, and a rate of change per unit time is calculated on the basis of this history. In an ensuing Step 124, a determination is made as to whether or not a calculated rate of change dT/dt is higher than a predetermined value G (e.g., 0.07° C./min). From this determination, the load of the batteries 12 is estimated.

Here, if it is determined that the load of the batteries 12 is low (dT/dt<G, i.e., the rate of change is lower than the predetermined value G), the operation proceeds to Step 126 to read the vehicle compartment temperature $T_R$ and the set temperature $T_{SET}$ which are outputted from the air conditioner ECU 46 of the air conditioner 16. Next, in Step 128, the air conditioning load, particularly the cooling load, of the air conditioner 16 is determined from the vehicle compartment temperature $T_R$ and the set temperature $T_{SET}$ thus read.

If the vehicle compartment temperature $T_R$ is higher than the set temperature $T_{SET}$, it can be decided that the air conditioner 16 is effecting the cooling down of the vehicle compartment interior, from which fact it can be determined that the cooling load is large. On the other hand, if the vehicle compartment temperature $T_R$ is close to or lower than the set temperature $T_{SET}$, it can be determined that particularly the cooling load is small in the air conditioning load.

Here, if it is determined in Step 124 that the load of the batteries 12 is large and the rate of increase in the battery temperature is high, and if it is determined in Step 128 that the air conditioning load is small, the operation proceeds to Step 130. Incidentally, the determination on the air condition load effected in Step 128 may be effected by the air conditioner ECU 46, and whether or not to proceed to Step 130 may be determined on the basis of the result of determination by the air conditioner ECU 46.

In Step 130, the battery temperature $T_B$ (e.g., an average value of the temperatures of the individual batteries 12) and the speed of the cooling fan 62 shown in FIG. 3, i.e., the volume of the cooling air, are set. Next, in Step 132, a determination is made as to whether the speed of the cooling fan 62 has been set to the Hi level, the Lo level, or OFF (stop).

Here, if the cooling fan 62 has been set to OFF, the operation proceeds to Step 110 to stop the cooling fan 62 and close the exhaust duct 68 by means of the changeover damper 70 (i.e., recirculation mode).

On the other hand, if the speed of the cooling fan 62 has been set to the Lo level, the operation proceeds to Step 134 to rotatively drive the cooling fan 62 at the Lo level. At the same time, the state of operation of the air conditioner 16 is read in Step 136. In Step 138, a determination is made on the air conditioning mode, and if the air conditioner 16 is being operated in the inside-air recirculation mode, the operation proceeds to Step 112 to close the exhaust duct 68 by means of the changeover damper 70 and cool the batteries 12 in the recirculation mode. Meanwhile, if the air conditioner 16 is being operated in the outside-air introducing mode, the operation proceeds to Step 140 to close the circulation duct 66 and cool the batteries 12 in the exhaust mode.

Namely, if the cooling apparatus 20 exhausts the cooling air to outside the vehicle when the air conditioner 16 is being operated in the inside-air recirculation mode, the pressure within the vehicle compartment 14 drops, so that outside air enters the vehicle compartment 14 through gaps and the like in the vehicle body, thereby increasing the air conditioning load or increasing the humidity. Thus the comfortable feature of the vehicle compartment 14 being air conditioned as well as the air conditioning efficiency decline. In contrast, if the mode is set in the recirculation mode, it is possible to prevent outside air from entering the vehicle compartment through the gaps and the like in the vehicle body, and it is possible to maintain the comfortable feature of the vehicle compartment being air conditioned.

Meanwhile, when the air conditioner 16 is being operated in the outside-air introducing mode, by operating the cooling apparatus 20 in the exhaust mode, it is possible to improve the efficiency with which outside air is taken in by the air conditioner 16, and it is possible to allow fresh outside air to enter the vehicle compartment 14 more efficiently.

In contrast, in the determination on the air condition load in Step 128, if it is determined that the air conditioning load (particularly the cooling load) is large, the operation proceeds to Step 134 to set the fan speed to the Lo level. Consequently, when the air condition load is large, priority in control is given to air conditioning control of the vehicle compartment 14. It should be noted that when the air conditioning load for the vehicle compartment 14 is large, control is provided to set the fan speed of the cooling fan 62 to the Lo level in this embodiment, but control may be provided to set the cooling fan 62 to OFF.

On the other hand, if it is determined that the cooling fan 62 has been set to the Hi level, the operation proceeds to Step 142 to drive the cooling fan 62 at the Hi level. Then, the operation proceeds to Step 144 to cool the batteries 12 in the recirculation/exhaust mode in which part of the cooling air is exhausted from the exhaust duct 68 to outside the vehicle.

In the recirculation/exhaust mode when the cooling fan 62 is operated at the Hi level, if the volume of the cooling air exhausted from the exhaust duct 68 to outside the vehicle increases relative to the volume of outside air introduced by the air conditioner 16, the pressure within the vehicle compartment 14 drops, so that outside air enters the vehicle compartment 14 through gaps and the like in the vehicle body, thereby increasing the air conditioning load or and causing a decline in the air conditioning efficiency. In addition, even if an attempt is made to supply the cooling air into the battery chamber 18 with the fan speed of the cooling fan 62 set at the Hi level, since the pressure within the vehicle compartment 14 is low, it is impossible to obtain a desired volume of cooling air, and the cooling efficiency declines. Further, if the mode is set in the recirculation mode without discharging the cooling air to outside the vehicle, the volume of cooling air which is circulated becomes large, resulting in a rise in the temperature of the vehicle compartment interior and increasing the air conditioning load of the air conditioner 16.

In contrast, by discharging to outside the vehicle part of the cooling air used in cooling the batteries 12 and by returning part of it to the interior of the vehicle compartment 14, it is possible to prevent a decline in the pressure within the vehicle compartment 14 and obtain a desired volume of cooling air. In addition, since the volume of cooling air which is returned to the interior of the vehicle compartment 14 becomes small, it is possible to control the air conditioning load of the air conditioner 16 from becoming large due to the cooling air which is recirculated, so that the comfortable feature of the vehicle compartment 14 is not impaired.

It should be noted that the ratio between the volume of cooling air which is circulated and the volume of air exhausted can be arbitrarily set by the amount of opening of the changeover damper 70. For example, when the volume of cooling air with the cooling fan 62 set at the Hi level is 150 m$^3$/min, and the volume of outside door introduced by the air conditioner 16 is 50 m$^3$/min, it suffices if the changeover damper 70 is controlled such that the volume of cooling air flowing into the exhaust duct 68 becomes 50 m$^3$/min, and the volume of cooling air flowing into the circulation duct 66 becomes 100 m$^3$/min. Consequently, it becomes possible to secure a desired volume of cooling air without impairing the comfortable feature of the vehicle compartment 14.

Namely, in the recirculation/exhaust mode, an arrangement may be provided such that the amount of opening of the circulation duct 66 and the amount of opening of the exhaust duct 68 are set in advance by means of the changeover damper 70. More preferably, however, the volume of outside air introduced in the air conditioner 16 or the amount of opening of the changeover dampers 36 of the air conditioner 16 may be read, and the amount of opening of the changeover damper 70 may be set in correspondence with that amount of opening. Still alternatively, the necessary volume of outside air to be introduced (the amount of opening of the changeover dampers 36) may be instructed from the battery ECU 74 to the air conditioner ECU 46, and the air conditioner 16 may control the changeover dampers 36 in accordance with that instruction.

Thus, as the operating condition of the air conditioner 16 which air conditions the interior of the vehicle compartment 14 or the air conditioning state in the vehicle compartment 14 by the air conditioner 16 is taken into consideration when the batteries 12 are cooled by using the conditioned air from the vehicle compartment 14, it is possible to effect the efficient cooling of the batteries 12 without impairing the comfortable feature of the vehicle compartment 14.

Figure 5:
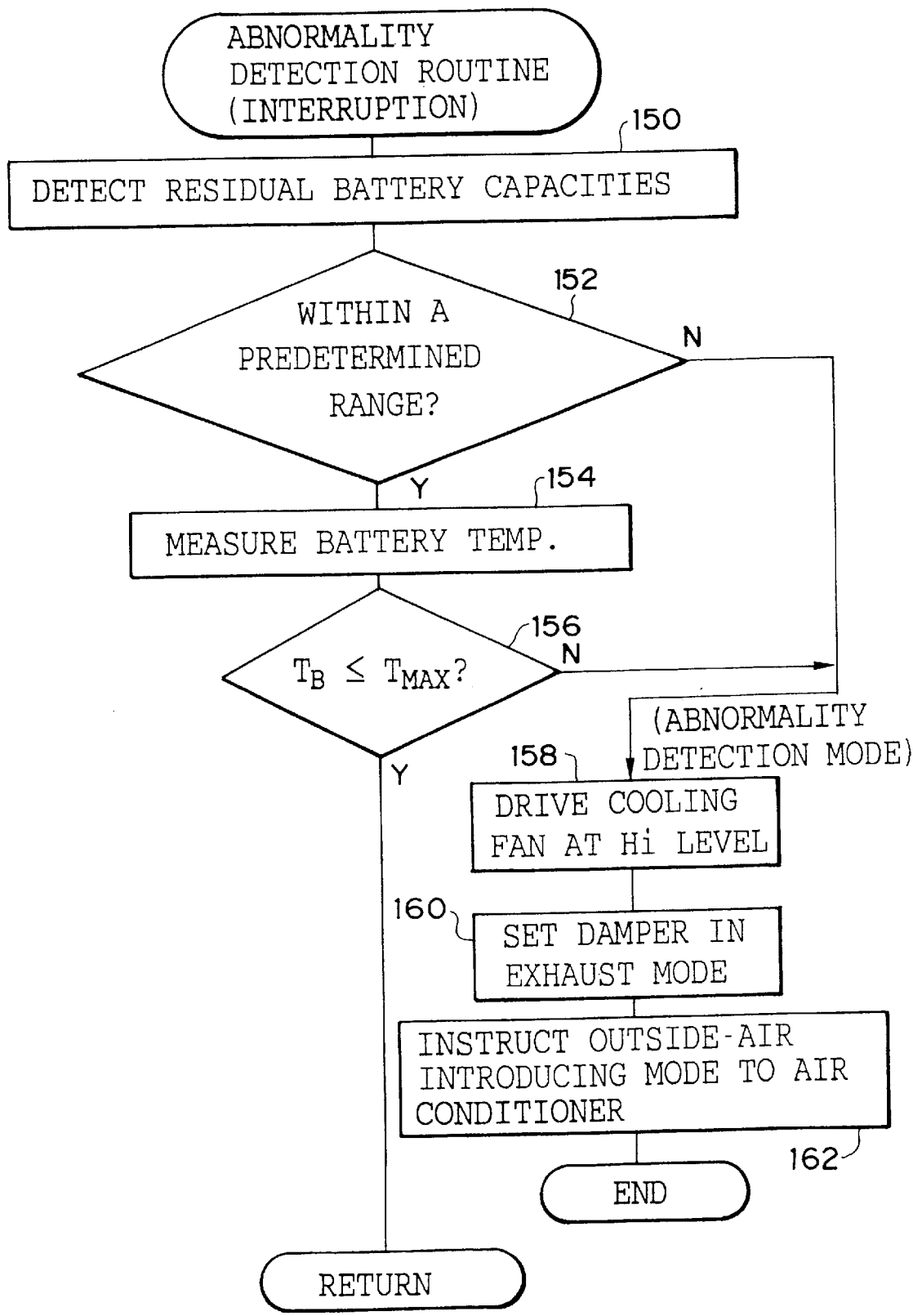
FIG. 5 is a flowchart illustrating an example of detection of an abnormality in the batteries and forced cooling.

Meanwhile, FIG. 5 shows an example of an interrupt routine which is executed in parallel with the flowcharts shown in FIGS. 4A and 4B and which effects detection of an abnormality in the batteries 12. Incidentally, the detection of an abnormality which is described below is not confined to the interrupt routine, and may be a routine which is executed prior to the execution of the flowcharts shown in FIGS. 4A and 4B.

In the first Step 150 of this flowchart, the residual capacities (SOC) of the batteries 12 are detected by the SOC sensor 80. Then, in Step 152, a determination is made as to whether or not the residual capacities (SOC) are within a predetermined range. Further, in Step 154, the battery temperature $T_B$ is measured, and a determination is made as to whether or not this battery temperature $T_B$ is less than or equal to a predetermined value (maximum allowable temperature) $T_{MAX}$.

When the residual capacity of the battery 12 is either large or small, the amount of heat generation is small. However, when a large load is applied or rapid recharging is effected while the residual capacity is in a predetermined range (e.g., 25%<SOC<75% in terms of the residual capacity (SOC) of the battery relative to a maximum charging capacity although the range differs depending on the characteristics of the battery 12), heat generation is promoted, and there is the risk of producing steam or the like. In addition, if the temperature of the battery 12 becomes high (e.g., 60° C. or higher), the charging and discharging capabilities decline, and the amount of heat generation becomes large, and if the high-temperature state continues, the product life is shortened.

For this reason, when the residual capacity (SOC) of the battery is in a predetermined range (YES in the determination in Step 152), and when the battery temperature TB has exceeded a predetermined value (maximum allowable temperature) $T_{MAX}$ (NO in the determination in Step 156), a determination is made that an abnormality has occurred in the battery 12, and the operation proceeds to a forced cooling mode.

In the forced cooling mode, in Step 158, the cooling fan 62 is operated at the Hi level and, in Step 160, the circulation duct 66 is closed and the exhaust duct 68 is opened by the changeover damper 70 so as to set the mode in the exhaust mode. Further, in Step 162, an instruction is given to the air conditioner 16 to operate by shifting the mode to the outside-air introducing mode.

Consequently, as the air conditioner 16 operates in the outside-air introducing mode, the cooling apparatus 20 is capable of cooling the batteries 12 with its maximum cooling capabilities, and is able to not only cope with the rise in the temperature of the battery 12 during the occurrence of an abnormality but also effect rapid cooling. At this time, the cooling air used in cooling the batteries 12 can be discharged reliably from the exhaust duct 68, and can be reliably prevented from leaking into the vehicle compartment 14.

Accordingly, it is possible to prevent an uncomfortable feeling from being imparted to the vehicle occupant due to the entry into the vehicle compartment 14 of the cooling air whose temperature has become high after cooling the batteries 12. At the same time, when steam or the like is contained in the cooling air, it is possible to reliably prevent from the humidity in the vehicle compartment 14 from rising due to the steam.

It should be noted that this forced cooling mode is continued until the abnormality in the battery 12 is overcome. In addition, when priority is given to the overcoming of the abnormality in the battery 12, not only is the air conditioner 16 operated in the outside-air introducing mode, but also the cooling capabilities of the cooling apparatus 20 in cooling the batteries 12 by using the air from the vehicle compartment 14 may be enhanced such as by increasing the volume of air delivered by the blower fan 34 or by lowering the set temperature $T_{SET}$.

Next, a description will be given of a second embodiment of the present invention. It should be noted that the basic configuration of the second embodiment is similar to that of the above-described first embodiment, so that identical parts will be denoted by the same reference numerals, and a description thereof will be omitted.

In the above-described first embodiment, when the rate of increase in the battery temperature $T_B$ calculated in Step 122 shown in FIG. 4B has exceeded the predetermined value G (large increase rate in the determination in Step 124), the air volume of the cooling fan 62 is set to the Lo level (hereafter referred to as the Lo mode). In the second embodiment, however, the criterion for determining the rate of increase is varied in correspondence with the battery temperature $T_B$.

Figure 6:
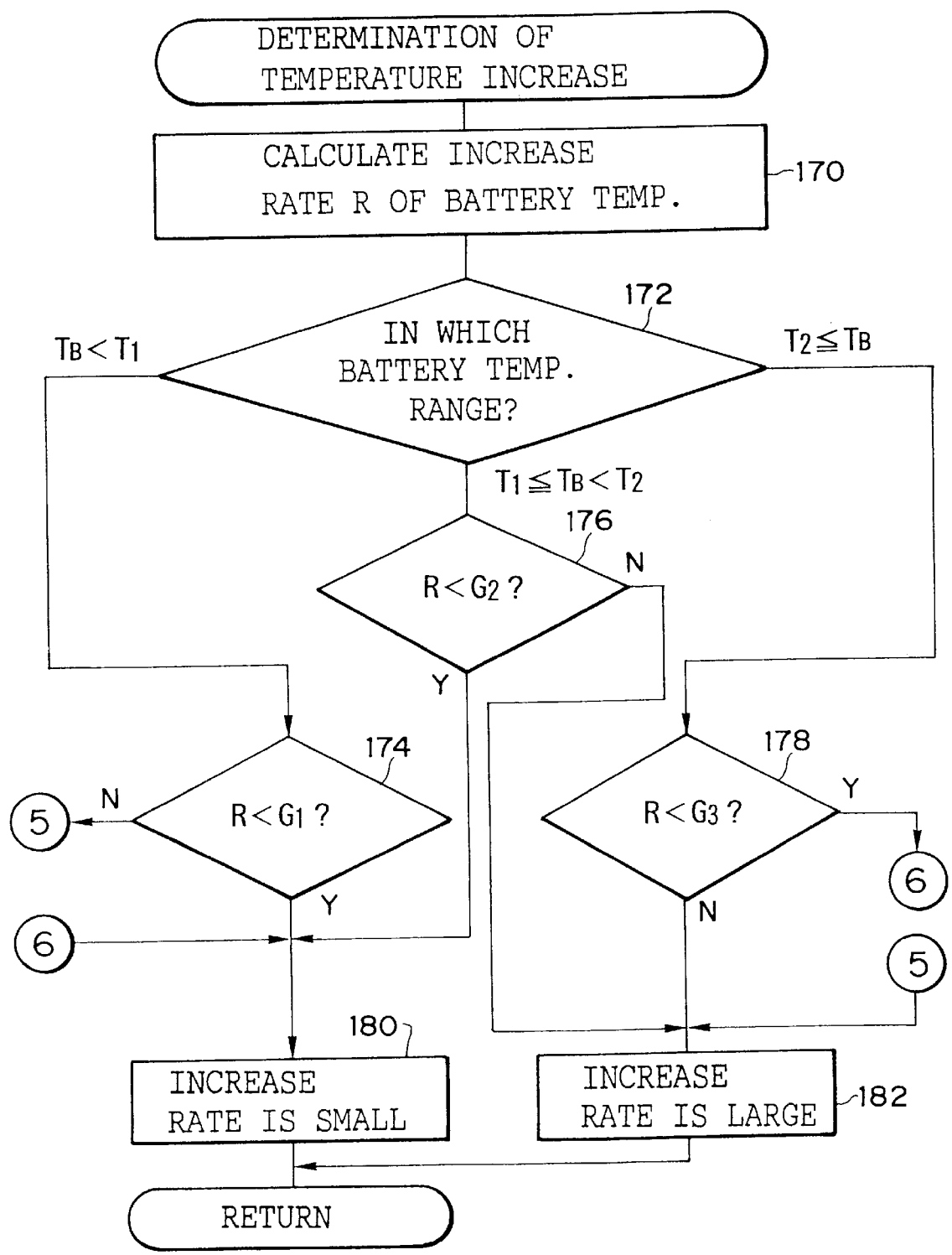
FIG. 6 is a flowchart illustrating an example of determination of an increase in the battery temperature in accordance with the second embodiment.

FIG. 6 shows a flowchart in accordance with the second embodiment. This flowchart is used in the determination of the rate of increase in the battery temperature $T_B$ in Step 124 in the flowchart shown in FIG. 4B.

In this flowchart, the predetermined value G (hereafter referred to as the reference value G) for determining whether or not the rate of increase R (dT/dt, e.g., a rate of temperature rise per minute) in the battery temperature $T_B$ is large is set into three stages, reference values $G_1$, $G_2$, and $G_3$ ($G_1>G_2>G_3$), in correspondence with the battery temperature $T_B$. The arrangement provided is such that when the battery temperature $T_B$ is lower than a temperature $T_1$, the reference value $G_1$ which is the highest setting is used, whereas when the battery temperature $T_B$ is higher than a temperature $T_2$ ($T_1<T_2$), the reference value $G_3$ which is the lowest setting is used.

In the first Step 170, the rate of increase R (° C./min) is calculated from the battery temperature $T_B$ which has been measured by the battery temperature sensors 76 and stored in a time series. Subsequently, in Step 172, a comparison is made between the current battery temperature $T_B$ on the one hand, and the respective temperatures $T_1$ and $T_2$, on the other.

If the battery temperature $T_B$ is lower than the temperature $T_1$ ($T_B<T_1$) as a result, the operation proceeds to Step 174, and the calculated rate of increase R is compared with the reference value $G_1$. On the other hand, if the battery temperature $T_B$ is greater than or equal to the temperature $T_1$ and is less than the temperature $T_2$ ($T_1 \leq T_B <T_2$), the operation proceeds to Step 176, whereas if the battery temperature $T_B$ is greater than or equal to the temperature $T_2$ ($T_2 \leq T_B$), the operation proceeds to Step 178, and the rate of increase R is compared with the reference value $G_2$ or $G_3$.

If it is determined in any one of Steps 174 to 178 that the rate of increase R in the battery temperature $T_B$ is less than the reference value G ($G_1$, $G_2$, or $G_3$) (YES in the determination in any one of Steps 174 to 178), the operation proceeds to Step 180 and a determination is made that the rate of increase R is low (i.e., small). On the other hand, if it is determined in any one of Steps 174 to 178 that the rate of increase R in the battery temperature $T_B$ is greater than or equal to the reference value G (NO in the determination in any one of Steps 174 to 178), the operation proceeds to Step 182 and a determination is made that the rate of increase R is high (i.e., large).

In the cooling apparatus 20, if it is determined that the rate of increase in the battery temperature $T_B$ is large, the operation proceeds to Step 130. Since the subsequent control is similar to that of the first embodiment, a description thereof will be omitted.

Namely, the higher the temperature (the battery temperature $T_B$) of the batteries 12, the more cooling is required. Hence, when the battery temperature $T_B$ is high, the cooling of the batteries 12 is required in comparison with the time when the battery temperature $T_B$ is low even if the rate of increase in the battery temperature $T_B$ is small.

Accordingly, by changing the reference value for determining the rate of increase in the battery temperature in correspondence with the battery temperature $T_B$, it is possible to cool the batteries 12 appropriately in correspondence with the temperature.

Next, a description will be given of a third embodiment of the present invention. It should be noted that the basic configuration of the third embodiment is similar to that of the above-described first embodiment, so that the same parts as those of the first embodiment will be denoted by the same reference numerals, and a detailed description thereof will be omitted.

In the third embodiment, the operating conditions and the temperature of the air (a targeted diffused air temperature $T_{AO}$ set by the air conditioner ECU 46) blown out from the air outlets 32 into the vehicle compartment 14 by the air conditioner 16 are outputted from the air conditioner ECU 46 to the battery ECU 74. In the battery ECU 74, the temperature detected by the cooling-air temperature sensor 78 is read as the temperature of the interior of the vehicle compartment 14 (vehicle compartment temperature $T_R$), and from the diffused air temperature $T_{AO}$ a determination is made as to whether or not the cooling load is large at the time when the air conditioning load is determined from the set temperature $T_{SET}$ and the vehicle compartment temperature $T_R$.

Figure 7:
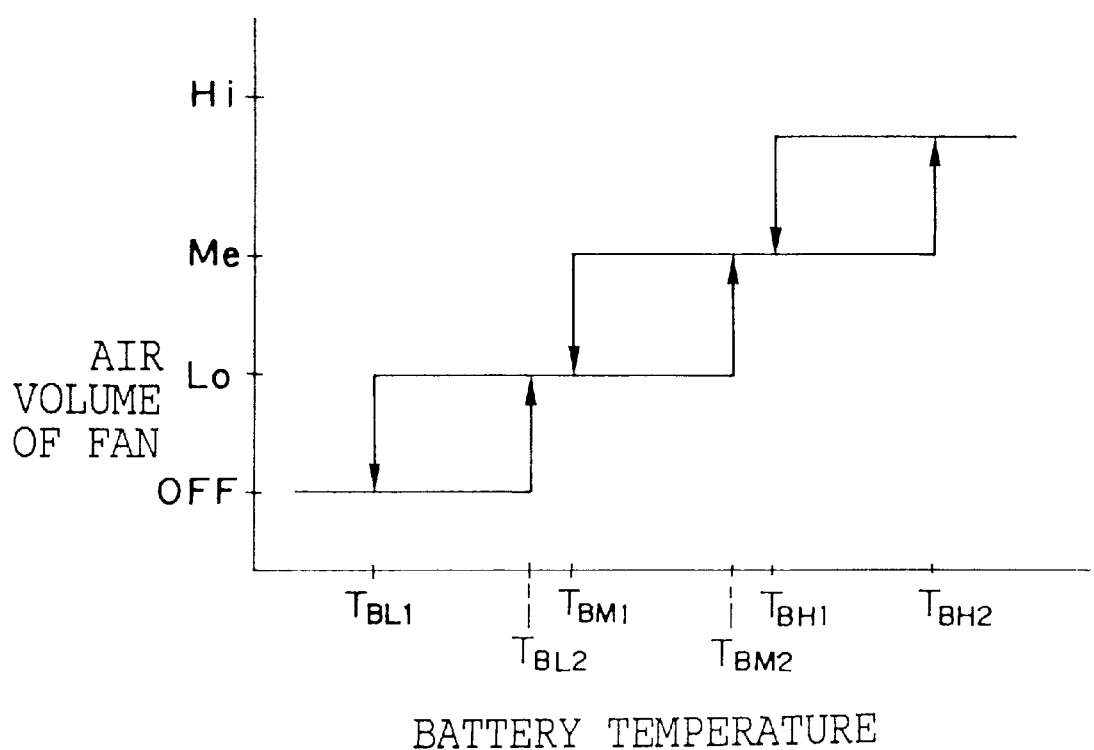
FIG. 7 is a diagram illustrating an example of the air volume delivered by the cooling fan of the cooling apparatus relative to the battery temperature in accordance with a third embodiment.

It should be noted that, as shown in FIG. 7, the air volume of the cooling fan 62 is changed over to one of the three stages, including the Lo level, the Me (medium) level, and the Hi level (respectively referred to as the Lo mode, Mo mode, and Hi mode) on the basis of preset temperatures $T_{BL1}$, $T_{BL2}$, $T_{BM1}$, $T_{BM2}$, $T_{BH1}$, and $T_{BH2}$ ($T_{BL1} < T_{BL2} < T_{BM1} < T_{BM2} < T_{BH1} < T_{BH2}$) and the state of operation of the cooling fan 62 persisting up until then. In addition, the changeover damper 70 is controlled on the basis of the mode of the cooling fan 62 and the mode of operation of the air conditioner 16.

FIGS. 8A to 11 show flowcharts in accordance with the third embodiment. It should be noted that, as shown in the flowcharts shown in FIGS. 8A and 8B, the standby timer is made to count down in accordance with the elapsed time, the intake air temperature $T_C$ is measured for each fixed time t at which time the standby timer is reset to "0," and the determination of the air conditioning load and the detection of the temperatures of the batteries 12 are effected. In addition, the temperatures of the batteries 12 are measured by the plurality of battery temperature sensors 76. As the battery temperature $T_B$, an average value of the detected values of the battery temperature sensors 76 is used, but the present invention is not limited to the same, and a lowest temperature or a highest temperature may be used.

Figure 8A:
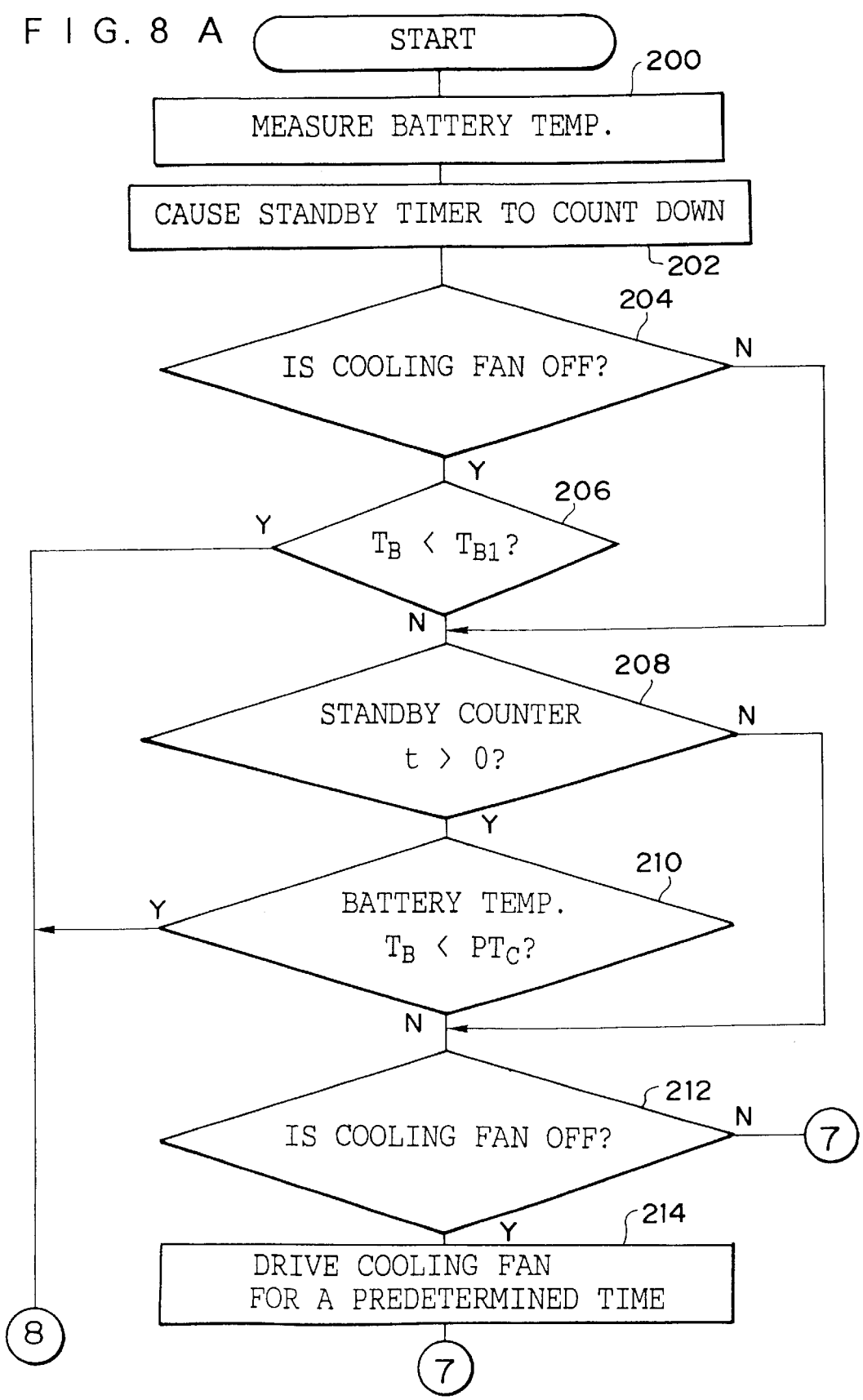
FIG. 8A is a flowchart illustrating an example of the operation of the cooling apparatus in accordance with the third embodiment.
Figure 8B:
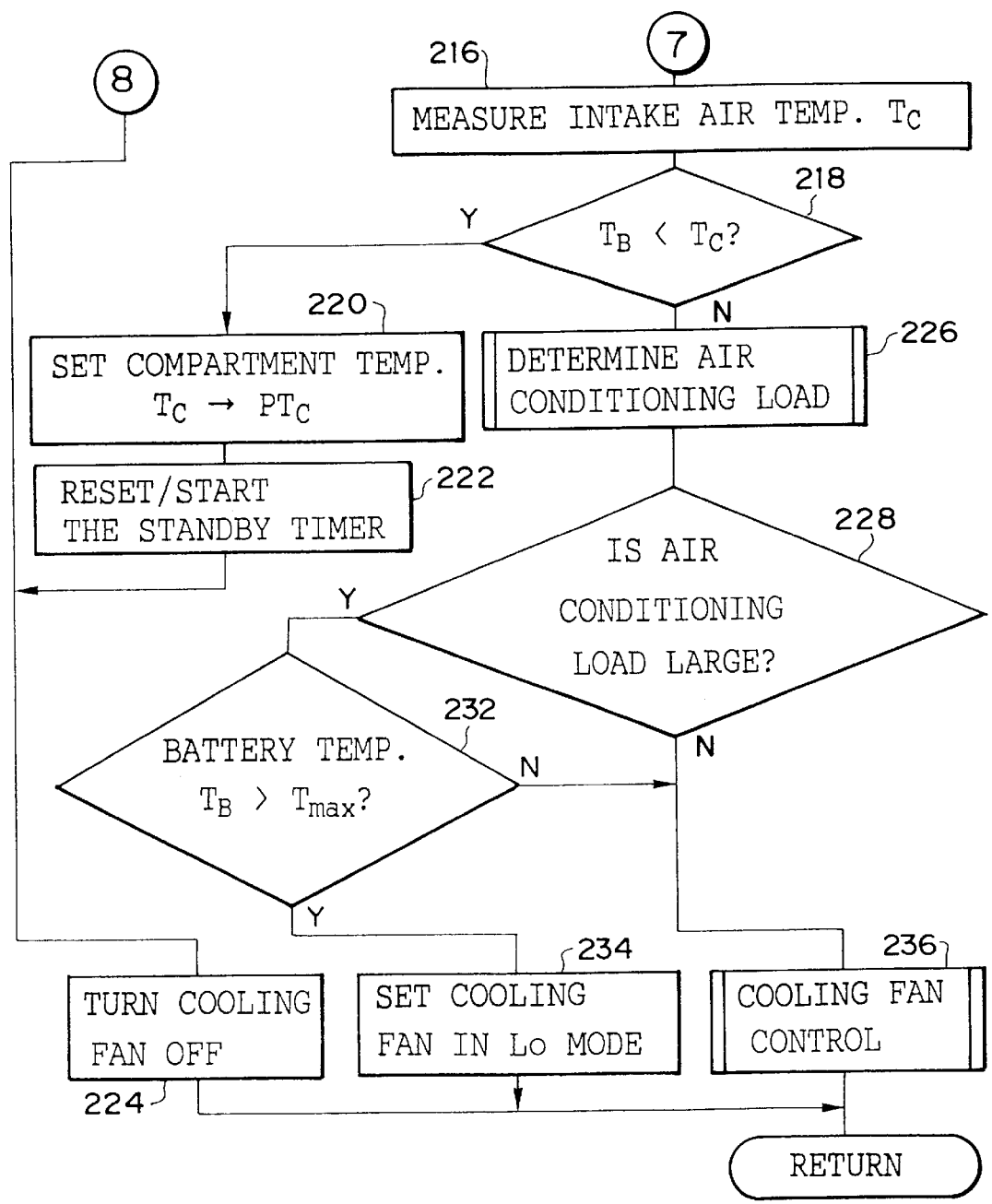
FIG. 8B is a flowchart continuing from FIG. 8A.

In the flowcharts shown in FIGS. 8A and 8B, the battery temperature $T_B$ is measured in the first Step 200, and the standby timer starts to count down in Step 202. Subsequently, in Step 204, confirmation is made as to whether or not the cooling fan 62 is off, and if the cooling fan 62 is off (YES in the determination in Step 204), the operation proceeds to Step 206 to determine whether or not the battery temperature $T_B$ is less than a predetermined temperature (whether or not the battery temperature $T_B$ is less than the temperature at which level or higher the cooling of the batteries 12 is generally required, e.g., the temperature $T_{B1}$). If the cooling fan 62 is being operated (NO in the determination in Step 204), or if the battery temperature $T_B$ is greater than or equal to the predetermined temperature (NO in the determination in Step 206), confirmation is made as to whether or not the count of the standby timer has reached "0" (Step 208) and whether or not the battery temperature $T_B$ is lower than the vehicle compartment temperature (Step 210). It should be noted that a temperature $PT_C$ is used as the vehicle compartment temperature, and this temperature $PT_C$ is currently the intake air temperature $T_C$ measured last time by the cooling-air temperature sensor 78.

Here, if the count of the standby timer has reached "0" (NO in the determination in Step 208) or if the vehicle compartment temperature (temperature $PT_C$) is lower than the battery temperature $T_B$ (NO in the determination in Step 210), the operation proceeds to an ensuing Step 212. On the other hand, if the cooling fan 62 is stopped, and the battery temperature $T_B$ is lower than the predetermined temperature (YES in the determinations in Steps 204 and 206), or if the count of the standby timer has not reached "0" and the vehicle compartment temperature (temperature $PT_C$) is higher than the battery temperature $T_B$ (YES in the determinations in Steps 208 and 210), the operation proceeds to Step 224 to turn the cooling fan 62 off.

In Step 212, confirmation is made as to whether or not the cooling fan 62 is off, and if the cooling fan 62 is off (YES in the determination), the operation proceeds to Step 214 to turn the cooling fan 62 on for a fixed time (e.g., for several seconds to tens of seconds). In Step 216, the temperature (intake air temperature $T_C$) of the air from the vehicle compartment 14 which is passed through the cooling duct 60 and is taken into the battery chamber 18 is measured by the cooling-air temperature sensor 78.

In Step 218, a comparison is made between the intake air temperature $T_C$ and the battery temperature $T_B$, and if the battery temperature $T_B$ is lower than the intake air temperature $T_C$ (YES in the determination in Step 218), the operation proceeds to Step 220 to set the intake air temperature $T_C$ to the temperature $P_{TC}$, and the standby timer is reset and started (Step 222) to assume the standby mode. Consequently, in an ensuing Step 224, the cooling fan 62 is turned off.

On the other hand, if the intake air temperature $T_C$ is lower than the battery temperature $T_B$ (NO in the determination in Step 218), since the batteries 12 can be cooled by using the air in the vehicle compartment 14, the operation proceeds to Step 226 to determine the air conditioning load.

Figure 9:
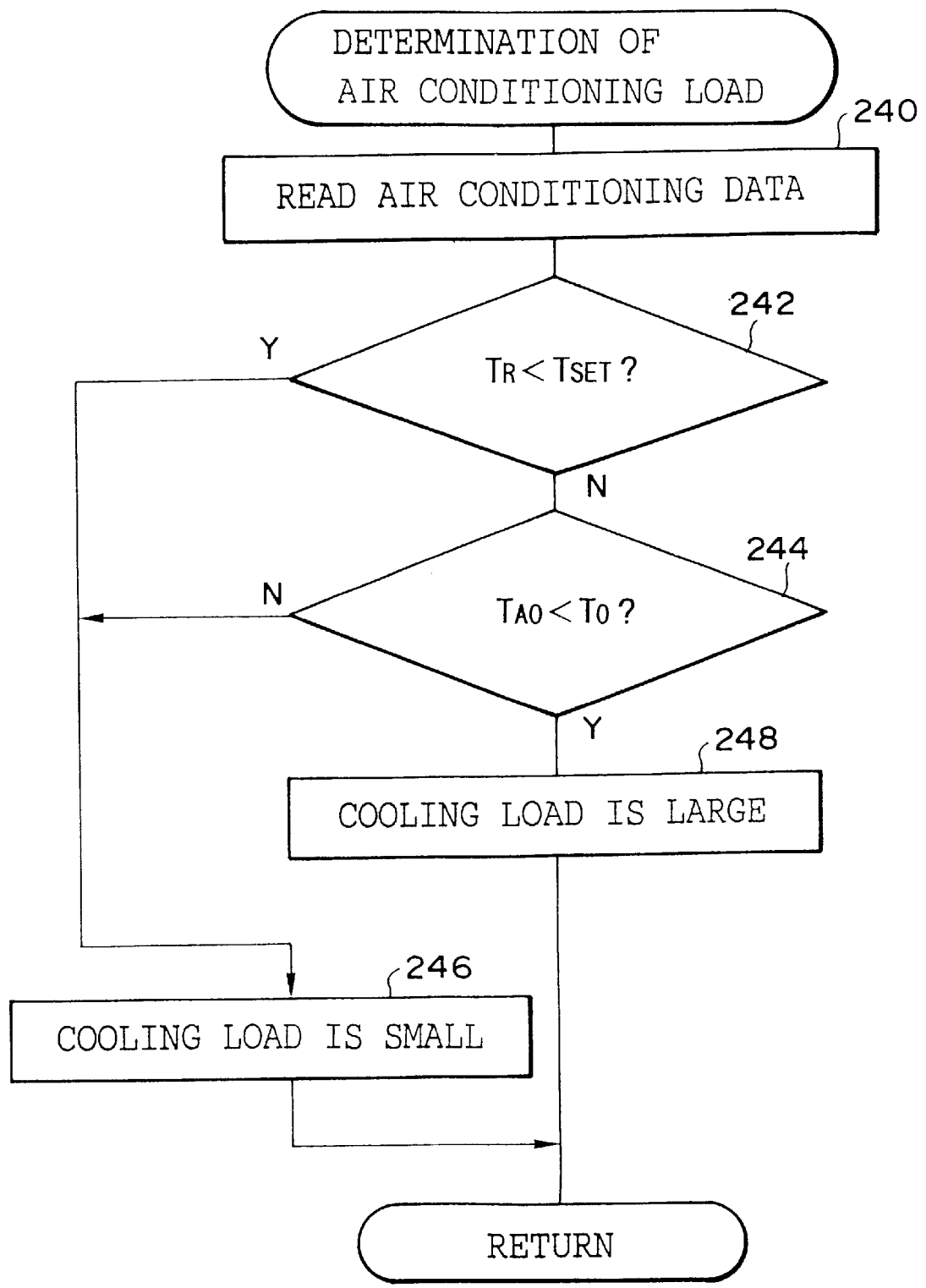
FIG. 9 is a flowchart illustrating an example of determination of air conditioning load in accordance with the third embodiment.

FIG. 9 shows a flowchart for determining the air conditioning load. In this flowchart, in the first Step 240, air conditioning data is read from the air conditioner 16, including the set temperature $T_{SET}$, the targeted diffused air temperature $T_{AO}$, the air volume of the blower, and the distinction between the outside-air introducing mode and the inside-air recirculation mode.

Next, in Step 242, a comparison is made between the set temperature $T_{SET}$ and the vehicle compartment temperature $T_R$. Here, if the set temperature $T_{SET}$ is higher than the vehicle compartment temperature $T_R$ (YES in the determination in Step 242), the operation proceeds to Step 246, and a determination is made that the cooling load of the air conditioner 16 for air conditioning the interior of the vehicle compartment 14 is small.

On the other hand, if the vehicle compartment temperature $T_R$ is higher than the set temperature $T_{SET}$ (NO in the determination in Step 242), there is a possibility that the cooling load is large, so that the operation proceeds to Step 244. In Step 244, a comparison is made between the targeted diffused air temperature $T_{AO}$ and a predetermined temperature $T_0$ which is set in advance for determining the cooling load by using the targeted diffused air temperature $T_{AO}$. Here, if the targeted diffused air temperature $T_{AO}$ is lower than the predetermined temperature $T_0$ (YES in the determination in Step 244), a determination is made that the cooling load of the air conditioner 16 is large (Step 248).

When the interior of the vehicle compartment 14 becomes warm by being heated by the air conditioner 16, the vehicle compartment temperature $T_R$ may become higher than the set temperature $T_{SET}$. For this reason, the determination as to whether or not the cooling load is large is difficult to make by the mere comparison between the set temperature $T_{SET}$ and the vehicle compartment temperature $T_R$.

In contrast, in the case of the air conditioner 16 which is performing the cooling operation (cooling down), the targeted diffused air temperature $T_{AO}$ is lower than the set temperature $T_{SET}$. When the cooling load of the air conditioner 16 is particularly large, the targeted diffused air temperature $T_{AO}$ is set to be lower than the predetermined temperature $T_0$ irrespective of the set temperature $T_{SET}$. Accordingly, by comparing the targeted diffused air temperature $T_{AO}$ and the predetermined temperature $T_0$, it is possible to accurately determine whether or not the air conditioner 16 is performing the cooling down during which the cooling load is large.

It should be noted that the intake air temperature $T_C$ detected by the cooling-air temperature sensor 78 or the temperature $PT_C$ may be used as the vehicle compartment temperature $T_R$. In addition, in Step 242, a determination may be made as to whether or not the absolute value of the difference between the set temperature $T_{SET}$ and the vehicle compartment temperature $T_R$ has exceeded a predetermined value, and the cooling load may be determined from the result of this determination and the result of comparison between the targeted diffused air temperature $T_{AO}$ and the predetermined temperature $T_0$.

In the flowchart shown in FIG. 8B, a determination is made on the air conditioning load in Step 226. In Step 228, confirmation is made as to whether or not a determination has been made that the cooling load is large.

If the air conditioner 16 is performing the cooling down and it is determined that the cooling load is large (YES in the determination in Step 228), the operation proceeds to Step 232 to determine whether or not the battery temperature $T_B$ has reached a maximum temperature $T_{max}$ at which level the batteries 12 require cooling.

Here, if the battery temperature $T_B$ has not exceeded the maximum temperature $T_{max}$ (NO in the determination in Step 232), the operation proceeds to Step 236, and the setting of the cooling fan 62 is determined by the battery temperature $T_B$. As a result, the batteries 12 are cooled by the air from the vehicle compartment 14.

Consequently, the batteries 12 whose temperature has risen are cooled, and the air used in cooling the batteries 12 is discharged to outside the vehicle. Incidentally, it is more preferable to allow the air conditioner 16 to be set in the outside-air introducing mode when the exhaust duct 68 is opened by the changeover damper 70.

On the other hand, if the battery temperature $T_B$ has exceeded the maximum temperature $T_{max}$ (YES in the determination in Step 232), the operation proceeds to Step 234 to set the cooling fan 62 in the Lo mode.

Thus, when the cooling load of the air conditioner 16 is large, the batteries 12 are cooled by operating the cooling fan 62 only when the battery temperature $T_B$ has exceeded the predetermined temperature (temperature $T_{max}$) set in advance. This makes it possible to minimize the cooling of the batteries 12, and prevent the cooling load of the air conditioner 16 from becoming increased further.

On the other hand, if it is determined that the cooling load is small (NO in the determination in Step 228), and if the battery temperature $T_B$ is smaller than the predetermined temperature (temperature $T_{max}$) set in advance (NO in the determination in Step 232), the operation proceeds to Step 236 to set the mode of operation of the cooling fan 62.

Figure 10:
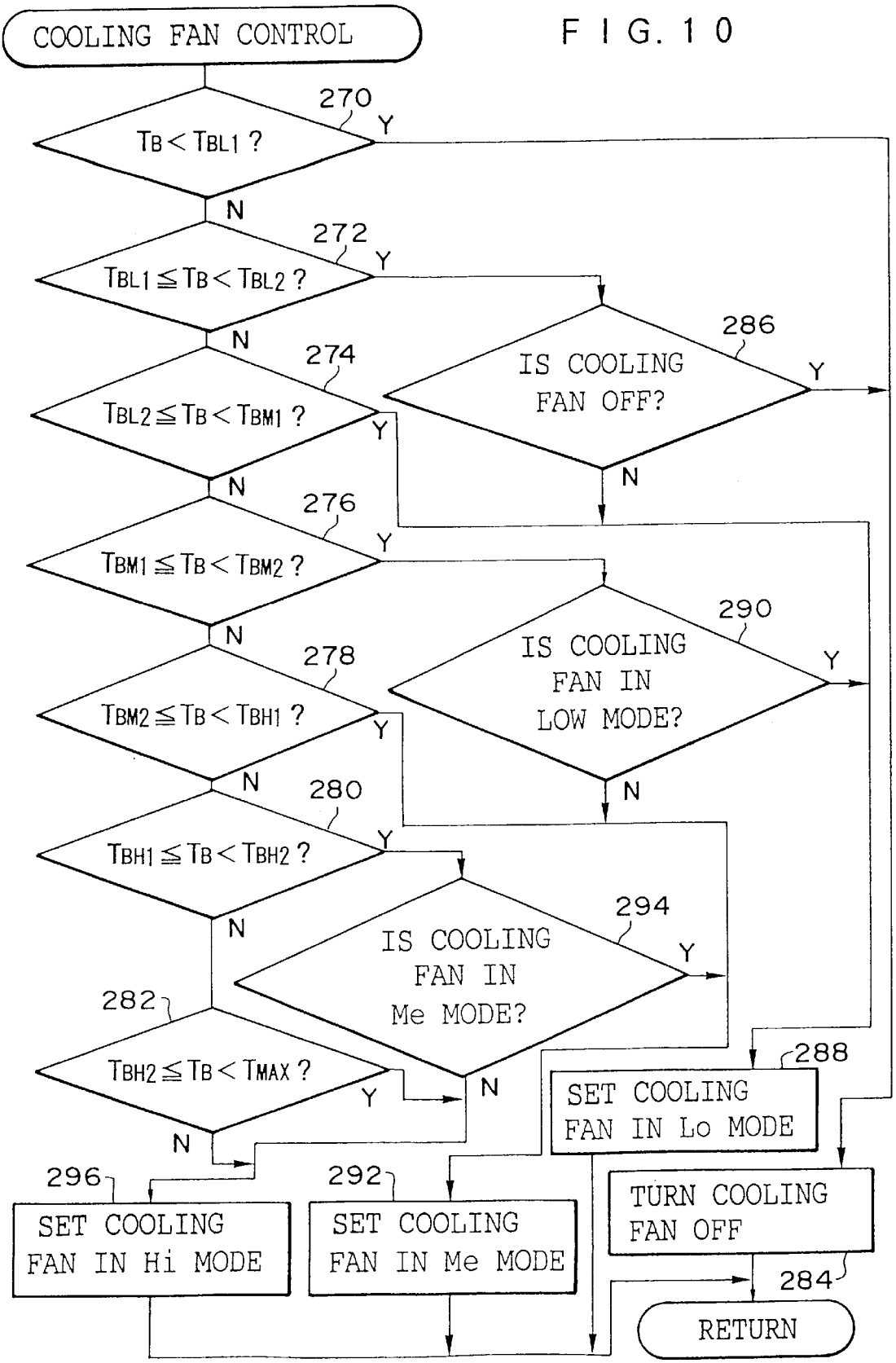
FIG. 10 is a flowchart illustrating an example of control of air volume delivered by the cooling fan in accordance with the third embodiment.

FIG. 10 shows one example of cooling fan control for setting the air volume of cooling by the cooling fan 62. It should be noted that, in this flowchart, the mode of operation of the cooling fan 62 is set on the basis of a change in the battery temperature $T_B$ shown in FIG. 7.

In this flowchart, in Steps 270 to 280, confirmation is made as to in what temperature range the battery temperature $T_B$ is among the ranges defined by the temperature $T_{BL1}$, the temperature $T_{BH2}$, and the maximum temperature $T_{max}$ ($T_{BH2}<T_{max}$).

In the battery temperature $T_B$ is less than the temperature $T_{BL1}$ (TB<$T_{BL1}$) (YES in the determination in Step 270), the operation proceeds to Step 284 to set the cooling fan 62 to off. Meanwhile, if the battery temperature $T_B$ is greater than or equal to the temperature $T_{BL1}$ and is less than the temperature $T_{BL2}$ ($T_{BL1} \leq T_B < T_{BL2}$) (YES in the determination in Step 272), the operation proceeds to Step 286 to confirm whether or not the cooling fan 62 is presently off.

Here, if the cooling fan 62 is off (YES in the determination in Step 286), the operation proceeds to Step 284 to set the cooling fan to off. If the cooling fan 62 is not off and is in the Lo mode (NO in the determination in Step 286), the operation proceeds to Step 288 to set the cooling fan 62 in the Lo mode.

If the battery temperature $T_B$ is greater than or equal to the temperature $T_{BL2}$ and is less than the temperature $T_{BM1}$ ($T_{BL2} \leq T_B < T_{BM1}$) (YES in the determination in Step 274), the operation proceeds to Step 288 to set the cooling fan 62 in the Lo mode.

Meanwhile, if the battery temperature $T_B$ is greater than or equal to the temperature $T_{BL1}$ and is less than the temperature $T_{BM2}$ ($T_{BL1} \leq T_B < T_{BM2}$) (YES in the determination in Step 276), the operation proceeds to Step 290 to confirm whether or not the cooling fan 62 is presently set in the Lo mode.

Here, if the cooling fan 62 is in the Lo mode (YES in the determination in Step 290), the operation proceeds to Step 288 to set the cooling fan 62 in the Lo mode. If the cooling fan 62 is not in the Lo mode but in the Me mode (NO in the determination in Step 290), the operation proceeds to Step 292 to set the cooling fan 62 in the Me mode.

If the battery temperature $T_B$ is greater than or equal to the temperature $T_{BM2}$ and is less than the temperature $T_{BM1}$ ($T_{BM2} \leq T_B < T_{BM1}$) (YES in the determination in Step 278), the operation proceeds to Step 292 to set the cooling fan 62 in the Me mode.

On the other hand, if the battery temperature $T_B$ is greater than or equal to the temperature $T_{BH1}$ and is less determination in Step 280), the operation proceeds to Step 294 to confirm whether or not the cooling fan 62 is presently set in the Me mode.

Here, if the cooling fan 62 is in the Me mode (YES in the determination in Step 294), the operation proceeds to Step 292 to set the cooling fan 62 in the Me mode. If the cooling fan 62 is not in the Me mode but in the Hi mode (NO in the determination in Step 294), the operation proceeds to Step 296 to set the cooling fan 62 in the Hi mode.

Further, if the battery temperature $T_B$ is greater than or equal to the temperature $T_{BH2}$, the operation proceeds to Step 296 to set the cooling fan 62 in the Hi mode.

Thus, if the mode of operation of the cooling fan 62, i.e., the volume of cooling air for cooling the batteries 12 is set, the setting of the mode of the changeover damper 70 is effected in synchronism with the setting of the mode of operation of the cooling fan 62.

FIG. 11 shows an example of control of the changeover damper 70. In this flowchart, in the first Step 300, confirmation is made as to whether or not the cooling fan 62 is off (whether or not it is set to off). If the cooling fan 62 is off (YES in the determination in Step 300), the operation proceeds to Step 302 to set the mode of the changeover damper 70 to the recirculation in the vehicle compartment in which the exhaust duct 68 is closed by the changeover damper 70. As a result, it is possible to prevent a decline in the air conditioning efficiency as a result of the fact that the air in the vehicle compartment 14 being air conditioned by the air conditioner 16 is necessarily discharged to outside the vehicle.

Meanwhile, if the cooling fan 62 is not off (NO in the determination in Step 300), the operation proceeds to Step 304 to confirm whether or not the cooling fan 62 is set in the Lo mode.

Here, if the cooling fan 62 is set in the Lo mode (YES in the determination in Step 304), the operation proceeds to Step 306 to read the air conditioning mode set for the air conditioner 16. Then, confirmation is made as to whether or not the air conditioner 16 has been set in the outside-air introducing mode (Step 308).

If the air conditioner 16 has been set in the outside-air introducing mode (YES in the determination in Step 308), the operation proceeds to Step 310 to set the changeover damper 70 in the position for exhausting air to outside the vehicle. Meanwhile, if the air conditioner 16 has not been set in the outside-air introducing mode (i.e., in the inside-air recirculation mode; NO in the determination in Step 308), the operation proceeds to Step 302 to set the changeover damper 70 in the recirculation mode (recirculation in the vehicle compartment) in which the exhaust duct 68 is closed.

On the other hand, if the cooling fan 62 has been set in the Me mode or the Hi mode (NO in the determination in Step 304), the operation proceeds to Step 312 to set the changeover damper 70 in the position for partially exhausting air to outside the vehicle.

It should be noted that, in the position for partially exhausting air to outside the vehicle, as described above, the amount of opening of the exhaust duct 68 by the changeover damper 70 (the ratio between the amount of opening of the exhaust duct 68 and the amount of opening of the circulation duct 66) is adjusted such that the volume of air introduced into the vehicle compartment 14 by the air conditioner 16 and the volume of air discharged from the exhaust duct 68 will substantially agree with each other. Consequently, it is possible to secure a desired volume of cooling air without impairing the comfortable feature of the vehicle compartment 14.

Thus, in the third embodiment, when the cooling load of the air conditioner 16 is low (small), the cooling fan 62 and the changeover damper 70 are controlled on the basis of the mode of operation of the air conditioner 16 and the battery temperature $T_B$, whereas when the cooling load of the air conditioner 16 is large, the batteries 12 are cooled only when the battery temperature $T_B$ has exceeded the maximum temperature $T_{max}$.

In general, when the vehicle travels, particularly while traveling in an urban area where there is a possibility of acceleration and deceleration being effected frequently, there is a possibility that the battery temperature $T_B$ changes frequently. In addition, if noise, measurement errors, and the like are included in addition to the change in the battery temperature $T_B$, there are cases where the rate of increase in the battery temperature $T_B$ is determined to be greater than an actual level. Consequently, although the battery temperature $T_B$ is relatively low and the rate of the temperature increase is low, the cooling fan 62 may be operated, thereby further increasing the cooling load when the cooling load is large.

That is, the batteries 12 are cooled by ignoring the cooling load of the air conditioner 16, which prevents the ensuring of the comfortable feature of the vehicle compartment 14 which is cooled by the air conditioner 16.

In contrast, in the third embodiment, when the cooling load of the air conditioner 16 is large, the batteries 12 are cooled by operating the cooling fan 62 only when the battery temperature has reached the temperature (maximum temperature $T_{max}$) at which the batteries 12 must be necessarily cooled.

In consequence, it is possible to reliably prevent the impairment of the comfortable feature of the vehicle compartment 14 when the cooling fan 62 is operated more than necessary due to the fact that the battery temperature $T_B$ has changed frequently at relatively low temperatures.

It should be noted that the above-described embodiments are not restrictive in terms of the configuration of the present invention, and the present invention can be applied to cooling apparatuses of various configurations for cooling the batteries 12 by using the air inside the vehicle compartment being air conditioned by an air conditioner.

What is claimed is:

1. A vehicle-use battery cooling system for cooling a battery mounted in a vehicle whose vehicle compartment is air conditioned by an air conditioner, so as to maintain the battery in a predetermined temperature range, comprising:
   a battery chamber for accommodating the battery;
   cooling means having a cooling fan and adapted to cool the battery by supplying air in the vehicle compartment to an interior of said battery chamber by said cooling fan;
   cooling-air circulating means for circulating air used in cooling the battery between said battery chamber and said vehicle compartment by guiding the air into said vehicle compartment;
   exhausting means for exhausting the air used in cooling the battery to outside the vehicle;
   changeover means for effecting a changeover between said cooling-air circulating means and said exhausting means;
   temperature detecting means for detecting at least one of a temperature of the interior of said battery chamber and a temperature of said battery; and
   changeover controlling means for selecting said exhausting means by said changeover means when the temperature detected by said temperature detecting means has become greater than or equal to a predetermined value.

2. A vehicle-use battery cooling system according to claim 1, further comprising:
   circulating-volume increasing means for increasing a volume of air to be circulated into the vehicle compartment by said cooling-air circulating means when a volume of air being delivered by said cooling fan of said cooling means is at a predetermined level or more.

3. A vehicle-use battery cooling system according to claim 2, wherein said circulating-volume increasing means selects said cooling-air circulating means by means of said changeover means.

4. A vehicle-use battery cooling system according to claim 1, further comprising:

comparing means for comparing a volume of air delivered from outside the vehicle into the vehicle compartment by a blower fan provided in said air conditioner and a volume of air delivered by said cooling fan; and circulating-volume increasing means for increasing a volume of air to be circulated into the vehicle compartment by said cooling-air circulating means when the volume of air being delivered by said cooling fan is greater as a result of comparison by said comparing means.

5. A vehicle-use battery cooling system according to claim 4, wherein said circulating-volume increasing means selects said cooling-air circulating means by means of said changeover means.

6. A vehicle-use battery cooling system according to claim 1, further comprising:

air-conditioning load determining means for determining an air conditioning load required for said air conditioner in air conditioning an interior of the vehicle compartment.

7. A vehicle-use battery cooling system according to claim 6, wherein said air-conditioning load determining means determines the air conditioning load by making a comparison between the temperature of the interior of the vehicle compartment detected by said temperature detecting means and a set temperature set in said air conditioner.

8. A vehicle-use battery cooling system according to claim 1, further comprising:

increase-rate determining means for determining an increase rate of the temperature of the battery on the basis of a result of detection by said temperature detecting means.

9. A vehicle-use battery cooling system for cooling a battery mounted in a vehicle whose vehicle compartment is air conditioned by an air conditioner, so as to maintain the battery in a predetermined temperature range, comprising:

a battery chamber for accommodating the battery;

cooling means having a cooling fan and adapted to cool the battery by supplying air in the vehicle compartment to an interior of said battery chamber by said cooling fan;

cooling-air circulating means for circulating air used in cooling the battery between said battery chamber and said vehicle compartment by guiding the air into said vehicle compartment;

exhausting means for exhausting the air used in cooling the battery to outside the vehicle;

changeover means for effecting a changeover between said cooling-air circulating means and said exhausting means;

battery-residual-capacity detecting means for detecting a residual capacity of the battery;

battery-residual-capacity determining means for determining whether or not the detected residual capacity is within a predetermined range set in advance; and exhaust controlling means for selecting said exhausting means by means of said changeover means and operating said cooling means when it is determined by said battery-residual-capacity determining means that the detected residual capacity is outside the predetermined range.

10. A vehicle-use battery cooling system according to claim 9, wherein said exhaust controlling means requests said air conditioner to introduce outside air into the vehicle compartment irrespective of a state of operation of said air conditioner.

11. A vehicle-use battery cooling system according to claim 9, further comprising:

temperature detecting means for detecting at least one of a temperature of the interior of said battery chamber and a temperature of said battery.

12. A vehicle-use battery cooling system according to claim 11, further comprising:

battery-temperature determining means for determining whether or not the temperature detected by said temperature detecting means is higher than a predetermined value when it is determined by said battery-residual-capacity determining means that the detected residual capacity is within the predetermined range set in advance.

13. A vehicle-use battery cooling system for cooling a battery mounted in a vehicle whose vehicle compartment is air conditioned by an air conditioner, so as to maintain the battery in a predetermined temperature range, comprising:

a battery chamber for accommodating the battery;

cooling means having a cooling fan and adapted to cool the battery by supplying air in the vehicle compartment to an interior of said battery chamber by said cooling fan;

cooling-air circulating means for circulating air used in cooling the battery between said battery chamber and said vehicle compartment by guiding the air into said vehicle compartment;

exhausting means for exhausting the air used in cooling the battery to outside the vehicle;

changeover means for effecting a changeover between said cooling-air circulating means and said exhausting means;

air-conditioning load determining means for determining an air conditioning load required for said air conditioner in air conditioning an interior of the vehicle compartment; and cooling controlling means for stopping the operation of said cooling fan when it is determined by said air-conditioning load determining means that the air conditioning load is greater than a predetermined value.

14. A vehicle-use battery cooling system according to claim 13, further comprising:

vehicle-compartment-temperature detecting means for detecting a temperature of the interior of the vehicle compartment.

15. A vehicle-use battery cooling system according to claim 14, wherein said air-conditioning load determining means determines the air conditioning load by making a comparison between the temperature of the interior of the vehicle compartment detected by said temperature detecting means and a set temperature set in said air conditioner.

16. A vehicle-use battery cooling system according to claim 15, wherein said air-conditioning load determining means determines that the air conditioning load is large when a difference between the temperature of the interior of the vehicle compartment detected by said vehicle-compartment-temperature detecting means and the set temperature is large, and when the temperature of delivered air which is delivered from said air conditioner into the vehicle compartment is lower than a predetermined value.

17. A vehicle-use battery cooling system according to claim 13, further comprising:

temperature detecting means for detecting at least one of the temperature of the interior of said battery chamber and a temperature of said battery.

18. A vehicle-use battery cooling system according to claim 17, further comprising:

temperature determining means for determining whether or not the temperature detected by said temperature detecting means is higher than a predetermined temperature.

19. A vehicle-use battery cooling system for cooling a battery mounted in a vehicle whose vehicle compartment is air conditioned by an air conditioner, so as to maintain the battery in a predetermined temperature range, comprising:

a battery chamber for accommodating the battery;

cooling means having a cooling fan and adapted to cool the battery by supplying air in the vehicle compartment to an interior of said battery chamber by said cooling fan;

cooling-air circulating means for circulating air used in cooling the battery between said battery chamber and said vehicle compartment by guiding the air into said vehicle compartment;

exhausting means for exhausting the air used in cooling the battery to outside the vehicle;

changeover means for effecting a changeover between said cooling-air circulating means and said exhausting means;

temperature detecting means for detecting at least one of a temperature of the interior of said battery chamber and a temperature of said battery;

increase-rate determining means for determining an increase rate of the temperature of the battery on the basis of a result of detection by said temperature detecting means; and changeover controlling means for selecting said exhausting means by said changeover means on the basis of a result of determination by said increase-rate determining means.

20. A vehicle-use battery cooling system according to claim 19, wherein said increase-rate determining means changes a criterion for determining the increase rate in correspondence with the temperature detected by said temperature detecting means.

21. A vehicle-use battery cooling system for cooling a battery mounted in a vehicle whose vehicle compartment is air conditioned by an air conditioner, so as to maintain the battery in a predetermined temperature range, comprising:

a battery chamber for accommodating the battery;

a cooling duct having a cooling fan and adapted to cool the battery by supplying air in the vehicle compartment to an interior of said battery chamber by said cooling fan;

a cooling-air circulating duct for circulating air used in cooling the battery between said battery chamber and said vehicle compartment by guiding the air into said vehicle compartment;

an exhausting duct for exhausting the air used in cooling the battery to outside the vehicle;

a changeover damper for effecting a changeover between said cooling-air circulating duct and said exhausting duct;

a temperature detecting sensor for detecting at least one of a temperature of the interior of said battery chamber and a temperature of said battery; and changeover controlling means for changing said changeover damper over to an exhausting duct side when the temperature detected by said temperature detecting sensor has become greater than or equal to a predetermined value.

22. A vehicle-use battery cooling system according to claim 21, further comprising:

circulating-volume increasing means for increasing a volume of air to be blown to said cooling-air circulating duct and increasing a volume of air to be circulated into the vehicle compartment when a volume of air being delivered by said cooling fan is at a predetermined level or more.

23. A vehicle-use battery cooling system according to claim 22, wherein said circulating-volume increasing means selects said cooling-air circulating duct by means of said changeover damper.

24. A vehicle-use battery cooling system according to claim 21, further comprising:

comparing means for comparing a volume of air delivered from outside the vehicle into the vehicle compartment by a blower fan provided in said air conditioner and a volume of air delivered by said cooling fan; and circulating-volume increasing means for increasing a volume of air to be circulated into the vehicle compartment by said cooling-air circulating duct when the volume of air being delivered by said cooling fan is greater as a result of comparison by said comparing means.

25. A vehicle-use battery cooling system according to claim 24, wherein said circulating-volume increasing means changes said changeover damper over to an exhausting duct side.

26. A vehicle-use battery cooling system according to claim 21, further comprising:

air-conditioning load determining means for determining an air conditioning load required for said air conditioner in air conditioning an interior of the vehicle compartment.

27. A vehicle-use battery cooling system according to claim 26, wherein said air-conditioning load determining means determines the air conditioning load by making a comparison between the temperature of the interior of the vehicle compartment detected by said temperature detecting sensor and a set temperature set in said air conditioner.

28. A vehicle-use battery cooling system according to claim 21, further comprising:

increase-rate determining means for determining an increase rate of the temperature of the battery on the basis of a result of detection by said temperature detecting sensor.

29. A vehicle-use battery cooling system for cooling a battery mounted in a vehicle whose vehicle compartment is air conditioned by an air conditioner, so as to maintain the battery in a predetermined temperature range, comprising:

a battery chamber for accommodating the battery;

a cooling duct having a cooling fan and adapted to cool the battery by supplying air in the vehicle compartment to an interior of said battery chamber by said cooling fan;

a cooling-air circulating duct for circulating air used in cooling the battery between said battery chamber and said vehicle compartment by guiding the air into said vehicle compartment;

an exhausting duct for exhausting the air used in cooling the battery to outside the vehicle;

a changeover damper for effecting a changeover between said cooling-air circulating duct and said exhausting duct;

a battery-residual-capacity detecting sensor for detecting a residual capacity of the battery;

battery-residual-capacity determining means for determining whether or not the detected residual capacity is within a predetermined range set in advance; and exhaust controlling means for changing said changeover damper over to an exhausting duct side and operating said cooling fan when it is determined by said battery-residual-capacity determining means that the detected residual capacity is outside the predetermined range.

30. A vehicle-use battery cooling system according to claim 29, wherein said exhaust controlling means requests said air conditioner to introduce outside air into the vehicle compartment irrespective of a state of operation of said air conditioner.

31. A vehicle-use battery cooling system according to claim 29, further comprising:

a temperature detecting sensor for detecting at least one of a temperature of the interior of said battery chamber and a temperature of said battery.

32. A vehicle-use battery cooling system according to claim 21, further comprising:

battery-temperature determining means for determining whether or not the temperature detected by said temperature detecting sensor is higher than a predetermined value when it is determined by said battery-residual-capacity determining means that the detected residual capacity is within the predetermined range set in advance.

33. A vehicle-use battery cooling system for cooling a battery mounted in a vehicle whose vehicle compartment is air conditioned by an air conditioner, so as to maintain the battery in a predetermined temperature range, comprising:

a battery chamber for accommodating the battery;

a cooling duct having a cooling fan and adapted to cool the battery by supplying air in the vehicle compartment to an interior of said battery chamber by said cooling fan;

a cooling-air circulating duct for circulating air used in cooling the battery between said battery chamber and said vehicle compartment by guiding the air into said vehicle compartment;

an exhausting duct for exhausting the air used in cooling the battery to outside the vehicle;

a changeover damper for effecting a changeover between said cooling-air circulating duct and said exhausting duct;

air-conditioning load determining means for determining an air conditioning load required for said air conditioner in air conditioning an interior of the vehicle compartment; and cooling controlling means for stopping the operation of said cooling fan when it is determined by said air-conditioning load determining means that the air conditioning load is greater than a predetermined value.

34. A vehicle-use battery cooling system according to claim 33, further comprising:

a vehicle-compartment-temperature detecting sensor for detecting a temperature of the interior of the vehicle compartment.

35. A vehicle-use battery cooling system according to claim 34, wherein said air-conditioning load determining means determines the air conditioning load by making a comparison between the temperature of the interior of the vehicle compartment detected by said vehicle-compartment-temperature detecting sensor and a set temperature set in said air conditioner.

36. A vehicle-use battery cooling system according to claim 35, wherein said air-conditioning load determining means determines that the air conditioning load is large when a difference between the temperature of the interior of the vehicle compartment detected by said vehicle-compartment-temperature detecting sensor and the set temperature is large, and when the temperature of delivered air which is delivered from said air conditioner into the vehicle compartment is lower than a predetermined value.

37. A vehicle-use battery cooling system according to claim 33, further comprising:

a temperature detecting sensor for detecting at least one of the temperature of the interior of said battery chamber and a temperature of said battery.

38. A vehicle-use battery cooling system according to claim 37, further comprising:

temperature determining means for determining whether or not the temperature detected by said temperature detecting sensor is higher than a predetermined temperature.

39. A vehicle-use battery cooling system for cooling a battery mounted in a vehicle whose vehicle compartment is air conditioned by an air conditioner, so as to maintain the battery in a predetermined temperature range, comprising:

a battery chamber for accommodating the battery;

a cooling duct having a cooling fan and adapted to cool the battery by supplying air in the vehicle compartment to an interior of said battery chamber by said cooling fan;

a cooling-air circulating duct for circulating air used in cooling the battery between said battery chamber and said vehicle compartment by guiding the air into said vehicle compartment;

an exhausting duct for exhausting the air used in cooling the battery to outside the vehicle;

a changeover damper for effecting a changeover between said cooling-air circulating duct and said exhausting duct;

a temperature detecting sensor for detecting at least one of a temperature of the interior of said battery chamber and a temperature of said battery;

increase-rate determining means for determining an increase rate of the temperature of the battery on the basis of a result of detection by said temperature detecting sensor; and changeover means for changing said changeover damper over to an exhausting duct side on the basis of a result of determination by said increase-rate determining means.

40. A vehicle-use battery cooling system according to claim 39, wherein said increase-rate determining means changes a criterion for determining the increase rate in correspondence with the temperature detected by said temperature detecting sensor.

* * * * *